United States Patent
Prasad et al.

(10) Patent No.: US 12,440,660 B2
(45) Date of Patent: Oct. 14, 2025

(54) MULTIUSE DISINFECTION CAP ASSEMBLY

(71) Applicant: Becton, Dickinson and Company, Franklin Lakes, NJ (US)

(72) Inventors: Shishir Prasad, Ramsey, NJ (US); Praveen Nalawade, Belagavi (IN)

(73) Assignee: Becton, Dickinson and Company, Franklin Lakes, NJ (US)

( * ) Notice: Subject to any disclaimer, the term of this patent is extended or adjusted under 35 U.S.C. 154(b) by 560 days.

(21) Appl. No.: 18/071,044

(22) Filed: Nov. 29, 2022

(65) Prior Publication Data
US 2024/0173535 A1  May 30, 2024

(51) Int. Cl.
*A61M 39/16* (2006.01)
*A61L 2/22* (2006.01)
*A61L 2/28* (2006.01)
*A61M 39/20* (2006.01)

(52) U.S. Cl.
CPC ............ *A61M 39/162* (2013.01); *A61L 2/22* (2013.01); *A61L 2/28* (2013.01); *A61M 39/20* (2013.01); *A61L 2202/15* (2013.01); *A61L 2202/24* (2013.01); *A61M 2205/6081* (2013.01); *A61M 2205/75* (2013.01)

(58) Field of Classification Search
CPC .... A61M 39/16; A61M 39/20; A61M 39/162; A61M 39/165; A61M 2205/6081; A61L 2202/15
See application file for complete search history.

(56) References Cited

U.S. PATENT DOCUMENTS

| | | | |
|---|---|---|---|
| 5,694,978 A | * | 12/1997 | Heilmann ............. A61M 39/20 138/89 |
| 8,671,496 B2 | | 3/2014 | Vaillancourt et al. |
| 8,696,820 B2 | | 4/2014 | Vaillancourt et al. |
| 8,740,864 B2 | | 6/2014 | Hoang et al. |
| 9,039,989 B2 | | 5/2015 | Liu et al. |
| 9,283,369 B2 | | 3/2016 | Ma et al. |
| 9,399,125 B2 | | 7/2016 | Burkholz |
| 9,480,833 B2 | | 11/2016 | Hoang et al. |
| D834,187 S | | 11/2018 | Ryan |
| 10,376,686 B2 | | 8/2019 | Burkholz et al. |
| 10,413,716 B2 | | 9/2019 | Sathe |
| 11,083,883 B2 | | 8/2021 | Ryan et al. |
| 11,273,298 B2 | | 3/2022 | Erekovcanski et al. |
| 11,344,715 B2 | | 5/2022 | Erekovcanski et al. |

(Continued)

*Primary Examiner* — Rebecca E Eisenberg
(74) *Attorney, Agent, or Firm* — SERVILLA WHITNEY LLC

(57) ABSTRACT

A multiuse disinfection cap assembly configured to disinfect a connector, comprising a cap, a housing, and a chamber. The cap comprises a closed top, an open bottom, a first sidewall comprising a ridge, and a center arm. The housing comprises an open top, an open bottom, and a sidewall comprising a plurality of ridges. The chamber comprises a perforated bottom and an open top, which comprises an opening configured to allow the center arm of the cap to engage a stopper located within the chamber. Each time the cap is pushed in a downward direction, the ridge of the cap slides over a ridge of the plurality of ridges of the housing to allow the cap to advance incrementally, and the center arm of the cap moves the stopper within the chamber to cause a disinfectant in the chamber to spray onto the connector.

20 Claims, 15 Drawing Sheets

(56) References Cited

U.S. PATENT DOCUMENTS

| | | |
|---|---|---|
| 11,389,636 B2 | 7/2022 | Coyle |
| 2009/0008393 A1* | 1/2009 | Howlett ................ A61M 39/20 220/380 |
| 2012/0016318 A1 | 1/2012 | Hoang et al. |
| 2012/0302968 A1 | 11/2012 | Tennican |
| 2012/0302997 A1 | 11/2012 | Gardner et al. |
| 2013/0035667 A1 | 2/2013 | Anderson et al. |
| 2013/0178804 A1 | 7/2013 | Tennican |
| 2013/0197485 A1 | 8/2013 | Gardner et al. |
| 2013/0338644 A1 | 12/2013 | Solomon et al. |
| 2014/0135739 A1 | 5/2014 | Solomon et al. |
| 2015/0005699 A1 | 1/2015 | Burbank et al. |
| 2015/0086441 A1 | 3/2015 | She et al. |
| 2016/0106968 A1 | 4/2016 | Solomon et al. |
| 2016/0144118 A1 | 5/2016 | Solomon et al. |
| 2016/0310720 A1 | 10/2016 | Solomon et al. |
| 2018/0055962 A1 | 3/2018 | Drmanovic |
| 2018/0064604 A1 | 3/2018 | Drmanovic |
| 2018/0071508 A1 | 3/2018 | Drmanovic |
| 2018/0085568 A1 | 3/2018 | Drmanovic |
| 2018/0200500 A1 | 7/2018 | Ziebol et al. |
| 2018/0214242 A1 | 8/2018 | Davis et al. |
| 2018/0214684 A1* | 8/2018 | Avula ................... A61M 39/162 |
| 2018/0250194 A1 | 9/2018 | Drmanovic |
| 2018/0256804 A1 | 9/2018 | Burbank et al. |
| 2018/0256880 A1 | 9/2018 | Follman et al. |
| 2018/0256881 A1 | 9/2018 | Hitchcock et al. |
| 2018/0256883 A1 | 9/2018 | Follman et al. |
| 2018/0369562 A1 | 12/2018 | Gardner et al. |
| 2019/0038888 A1 | 2/2019 | Gardner |
| 2019/0076885 A1 | 3/2019 | Ryan et al. |
| 2019/0099593 A1 | 4/2019 | Avula et al. |
| 2019/0117332 A1 | 4/2019 | Davis et al. |
| 2019/0201681 A1 | 7/2019 | Ziebol et al. |
| 2019/0262525 A1 | 8/2019 | Wyeth et al. |
| 2019/0282795 A1 | 9/2019 | Fangrow |
| 2019/0351212 A1 | 11/2019 | Dudar et al. |
| 2020/0121858 A1 | 4/2020 | Anderson et al. |
| 2020/0139037 A1 | 5/2020 | Ziebol et al. |
| 2020/0155794 A1 | 5/2020 | Ziebol |
| 2020/0197686 A1 | 6/2020 | Anderson et al. |
| 2020/0238070 A1 | 7/2020 | Ryan |
| 2021/0001110 A1 | 1/2021 | Bedoe et al. |
| 2021/0093791 A1 | 4/2021 | Anderson et al. |
| 2021/0275707 A1 | 9/2021 | Jiang et al. |
| 2021/0322749 A1 | 10/2021 | Rothenberg et al. |
| 2021/0322750 A1 | 10/2021 | Harandi et al. |
| 2021/0322751 A1 | 10/2021 | Jiang et al. |
| 2021/0322752 A1 | 10/2021 | Jiang et al. |
| 2022/0118240 A1 | 4/2022 | Brand et al. |
| 2022/0273931 A1* | 9/2022 | Jiang ..................... A61M 39/20 |

\* cited by examiner

MULTIUSE DISINFECTION CAP ASSEMBLY

BACKGROUND OF THE INVENTION

Field of the Invention

The present disclosure relates generally to caps for medical connectors and, in particular, to a multiuse disinfection cap assembly to be attached to needle free connectors for sealing, cleaning, and disinfecting portions of the needle free connectors.

Description of Related Art

Vascular access devices (VADs) are commonly used medical devices, which can include intravenous (IV) catheters, such as peripheral catheters or central venous catheters, and include needle free connectors (NFCs). If not properly maintained or if exposed to a non-sterile environment, the NFCs and VADs can become contaminated, sealed with blood clots, and/or can spread infection. Further, bacteria and other microorganisms may gain entry into a patient's vascular system from NFCs and access hubs, ports, or valves upon connection to the VAD to deliver a fluid or pharmaceutical to a patient. For example, when a patient goes to the restroom, the nurse may disconnect the IV line, thereby exposing the NFC to contamination while the patient is in or travelling to or from the restroom. Therefore, each NFC or access hub (or port/valve or connection) configured for attachment to a VAD is associated with some risk of transmitting a catheter related bloodstream infection (CRBSI) to a patient.

Many medical facilities implement sterile practices and protocols to ensure that VADs and NFCs, access hubs, ports, and the like are used properly and do not become sealed or infected. These protocols often include sterilizing the NFCs, access hubs, ports, and VADs, as well as flushing the catheter with a flush solution prior to use. Specifically, VAD standards of practice usually recommend flush procedures be performed after catheter placement, before fluid infusion, and before and after drug administration, blood sampling, transfusions, and/or administration of parenteral nutrition. Standards of practice can also require that NFCs, access hubs, ports, and valves be capped with caps, including disinfection caps, when not in use, to prevent microbial ingress into the hub, port, or valve and to sterilize areas of the NFC, hub, port, or valve that contact the VAD. Some caps may cover the luer end of NFCs, access hubs, or ports of VADs but may have slits or openings that may lead to CRBSI. Disinfection caps are disposable cap devices that contain an amount of cleaning or disinfecting solution for sterilizing portions of the NFC, port, hub, or valve.

Some examples of disinfection caps are known. For example, U.S. Pat. No. 9,480,833, entitled "Antimicrobial IV Access Cap," which is incorporated herein by reference in its entirety, discloses a cap having an inner surface for retaining an antimicrobial agent configured to engage a portion of the NFC or access port of a VAD. U.S. Patent Application Publication No. 2019/0076885 entitled "Integrated Cleaning and Disinfection Device, System, and Method," which is incorporated herein by reference in its entirety, discloses a single piece device which enables medical clinicians to clean and disinfect both an injection port for a NFC IV connector and a VAD catheter hub.

However, there is a need for a disinfection cap that includes an active mechanism that can be used multiple times to disinfect the NFC or port area of a VAD.

SUMMARY OF THE INVENTION

According to an aspect of the present disclosure, described is a multiuse disinfection cap assembly configured to engage a NFC of a VAD that includes a spray mechanism within the multiuse disinfection cap assembly to disinfect the NFC surface or contact area multiple times after the multiuse disinfection cap assembly is affixed to the NFC. The multiuse disinfection cap assembly can be further configured to enclose the complete proximal end of the NFC. In another aspect of the disclosure, the spray mechanism can be further configured to be used multiple times, but to cease use and permit removal after reaching a maximum number of uses or time of use.

In accordance with an embodiment of the present invention, a multiuse disinfection cap assembly configured to disinfect a connector, includes a cap comprising a closed top, an open bottom, and a first sidewall extending between the top of the cap and the bottom of the cap, wherein the first sidewall of the cap comprises at least one ridge on an interior surface of the first sidewall of the cap, and wherein the cap further comprises a center arm extending from a center of the top of the cap toward a center of the bottom of the cap; a housing comprising an open top, an open bottom, and a sidewall extending between the top of the housing and the bottom of the housing, wherein the sidewall of the housing comprises a plurality of ridges on an exterior surface of the sidewall of the housing that are parallel to the at least one ridge of the first sidewall of the cap and are configured to engage, in sequence, with the at least one ridge of the first sidewall of the cap; and a chamber attached to the cap and configured to be inserted into the housing, the chamber comprising an open top and a perforated bottom, wherein the top of the chamber comprises an opening configured to allow the center arm of the cap to extend into the chamber and engage a stopper located within the chamber that seals the top of the chamber; wherein the cap is configured to enclose at least a portion of the housing and to be pushed in a downward direction toward the bottom of the chamber a plurality of times, wherein each time of the plurality of times the cap is pushed: (i) the at least one ridge of the first sidewall of the cap slides over a ridge of the plurality of ridges of the sidewall of the housing to allow the cap to advance incrementally in the downward direction; and (ii) the center arm of the cap moves the stopper within the chamber to cause a disinfectant in the chamber to spray out of the perforated bottom of the chamber and onto the connector.

In accordance with an embodiment of the present invention, the cap further includes a window in the first sidewall of the cap, wherein the housing further comprises a plurality of visual indicia on the exterior surface of the sidewall of the housing associated with a number of uses of the multiuse disinfection cap assembly, and wherein each time of the plurality of times the cap is pushed, the first sidewall of the cap moves over the exterior surface of the sidewall of the housing to reveal a different visual indicium of the plurality of visual indicia via the window.

In accordance with an embodiment of the present invention, the plurality of visual indicia includes a plurality of different colors.

In accordance with an embodiment of the present invention, wherein, after the cap is pushed a final time of the plurality of times, in which the at least one ridge of the first sidewall of the cap slides over a ridge of the plurality of ridges of the sidewall of the housing that is most distal to the top of the cap, a final visual indicium of the plurality of visual indicia is shown via the window in the first sidewall, wherein the final visual indicium indicates the chamber is empty.

In accordance with an embodiment of the present invention, wherein the housing includes a threaded portion on an interior surface of the open bottom of the housing, and wherein the housing is configured to receive at least an end of the connector inside the housing and to be threaded onto the connector with the threaded portion so that the housing and the connector are fastened together during disinfection of the connector.

In accordance with an embodiment of the present invention, further including a gripper having a curved wall comprised of a flexible polymer in a shape of an unconnected ring, wherein the curved wall includes an opening in a circumference of the curved wall, wherein a width of the opening is smaller than a width of a body of the connector, and wherein the gripper is configured to flexibly snap onto the body of the connector, such that the opening of the curved wall is configured to be temporarily widened to allow the body of the connector to pass through the opening and to allow the gripper to engage the body of the connector with an interior of the curved wall of the gripper; and a strap configured to be attached by a first end of the strap to the gripper and by a second end of the strap to the housing, such that the housing is connectable to the connector via the strap and the gripper.

In accordance with an embodiment of the present invention, wherein each ridge of the plurality of ridges of the sidewall of the housing is shaped with a first side forming a slope configured to allow the at least one ridge of the first sidewall of the cap to slide over said each ridge in the downward direction, and is further shaped with a second side forming a wall to prevent the at least one ridge of the first sidewall of the cap to slide over said each ridge in an upward direction opposite the downward direction.

In accordance with an embodiment of the present invention, wherein the at least one ridge of the first sidewall of the cap extends from only a portion of a perimeter of the first sidewall of the cap, wherein the plurality of ridges of the sidewall of the housing extend from only a portion of a perimeter of the sidewall of the housing, wherein the exterior surface of the sidewall of the housing comprises a channel comprising the plurality of ridges and extending along the exterior surface of the sidewall of the housing in a direction parallel to the downward direction, and wherein the at least one ridge of the first sidewall of the cap is configured to be confinably engaged in the channel including the plurality of ridges between each time of the plurality of times the cap is pushed.

In accordance with an embodiment of the present invention, wherein the cap is further configured such that, after the cap is pushed a final time of the plurality of times, in which the at least one ridge of the first sidewall of the cap slides over a ridge of the plurality of ridges of the sidewall of the housing that is most distal to the top of the cap, the at least one ridge escapes the channel of the sidewall of the housing to allow the cap to be rotated and removed from the housing.

In accordance with an embodiment of the present invention, wherein the cap includes a second sidewall extending between the top of the cap and the bottom of the cap, wherein the second sidewall is surrounded by the first sidewall, and wherein a sidewall of the chamber is slidably engaged with the second sidewall of the cap.

In accordance with an embodiment of the present invention, the cap further includes a filter positioned adjacent the perforated bottom of the chamber to block air and prevent leakage of the disinfectant.

In accordance with an embodiment of the present invention, a multiuse disinfection cap assembly configured to disinfect a connector includes a cap having a closed top, an open bottom, a first sidewall extending between the top of the cap and the bottom of the cap, and a second sidewall extending between the top of the cap and the bottom of the cap, wherein the second sidewall is surrounded by the first sidewall, wherein the first sidewall of the cap comprises at least one ridge on an interior surface of the first sidewall of the cap that is configured to engage, in sequence, with a plurality of ridges on an exterior surface of a sidewall of a housing attached to the connector, and wherein the cap further comprises a center arm extending from a center of the top of the cap toward a center of the bottom of the cap; and a chamber comprising a sidewall extending between an open top of the chamber and a perforated bottom of the chamber, wherein the sidewall of the chamber is slidably engaged with the second sidewall of the cap, and wherein the top of the chamber comprises an opening configured to allow the center arm of the cap to extend into the chamber and engage a stopper located within the chamber that seals the top of the chamber; wherein the cap is configured to be pushed in a downward direction toward the bottom of the chamber a plurality of times, wherein each time of the plurality of times the cap is pushed: (i) the at least one ridge of the first sidewall of the cap slides over a ridge of the plurality of ridges of the sidewall of the housing to allow the cap to advance incrementally in the downward direction; and (ii) the center arm of the cap moves the stopper within the chamber to cause a disinfectant in the chamber to spray out of the perforated bottom of the chamber and onto the connector.

In accordance with an embodiment of the present invention, the cap further includes a window in the first sidewall of the cap, and wherein each time of the plurality of times the cap is pushed, the first sidewall of the cap moves over the housing to reveal, via the window, a different visual indicium of a plurality of visual indicia on an exterior surface of the sidewall of the housing.

In accordance with an embodiment of the present invention, wherein each ridge of the at least one ridge of the first sidewall of the cap is shaped with a first side forming a slope configured to allow said each ridge to slide over the plurality of ridges of the sidewall of the housing in the downward direction, and is further shaped with a second side forming a wall to prevent said each ridge from sliding over the plurality of ridges of the sidewall of the housing in an upward direction opposite the downward direction.

In accordance with an embodiment of the present invention, the cap further including a filter positioned adjacent the perforated bottom of the chamber to block air and prevent leakage of the disinfectant.

In accordance with an embodiment of the present invention, wherein the cap is further configured such that, after the cap is pushed a final time of the plurality of times, in which the at least one ridge of the first sidewall of the cap slides over a ridge of the plurality of ridges of the sidewall of the housing that is most distal to the top of the cap, the at least one ridge escapes a channel of the sidewall of the housing to allow the cap to be rotated and removed from the housing.

In accordance with an embodiment of the present invention, a multiuse disinfection cap assembly configured to disinfect a connector includes a cap having a closed top, an open bottom, a first sidewall extending between the top of the cap and the bottom of the cap, and a window in the first sidewall of the cap, wherein the first sidewall of the cap comprises at least one ridge on an interior surface of the first sidewall of the cap that is configured to engage, in sequence, with a plurality of ridges on an exterior surface of a sidewall of a housing attached to the connector, and wherein the cap further comprises a center arm extending from a center of the top of the cap toward a center of the bottom of the cap; and a chamber comprising an open top and a perforated bottom, wherein the top of the chamber comprises an opening configured to allow the center arm of the cap to extend into the chamber and engage a stopper located within the chamber that seals the top of the chamber; wherein the cap is configured to enclose at least a portion of the housing and to be pushed in a downward direction toward the bottom of the chamber a plurality of times, wherein each time of the plurality of times the cap is pushed: (i) the at least one ridge of the first sidewall of the cap slides over a ridge of the plurality of ridges of the sidewall of the housing to allow the cap to advance incrementally in the downward direction; (ii) the first sidewall of the cap moves over the housing to reveal, via the window, a different visual indicium of a plurality of visual indicia on an exterior surface of the sidewall of the housing; and (iii) the center arm of the cap moves the stopper within the chamber to cause a disinfectant in the chamber to spray out of the perforated bottom of the chamber and onto the connector.

In accordance with an embodiment of the present invention, wherein each ridge of the at least one ridge of the first sidewall of the cap is shaped with a first side forming a slope configured to allow said each ridge to slide over the plurality of ridges of the sidewall of the housing in the downward direction, and is further shaped with a second side forming a wall to prevent said each ridge from sliding over the plurality of ridges of the sidewall of the housing in an upward direction opposite the downward direction.

In accordance with an embodiment of the present invention, the cap further including a filter positioned adjacent the perforated bottom of the chamber to block air and prevent leakage of the disinfectant.

In accordance with an embodiment of the present invention, wherein the cap is further configured such that, after the cap is pushed a final time of the plurality of times, in which the at least one ridge of the first sidewall of the cap slides over a ridge of the plurality of ridges of the sidewall of the housing that is most distal to the top of the cap, the at least one ridge escapes a channel of the sidewall of the housing to allow the cap to be rotated and removed from the housing.

These and other features and characteristics of the present disclosure, as well as the methods of operation and functions of the related elements of structures and the combination of parts and economics of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments or aspects that are illustrated in the accompanying schematic figures, in which.

DESCRIPTION OF THE INVENTION

Figure 1:
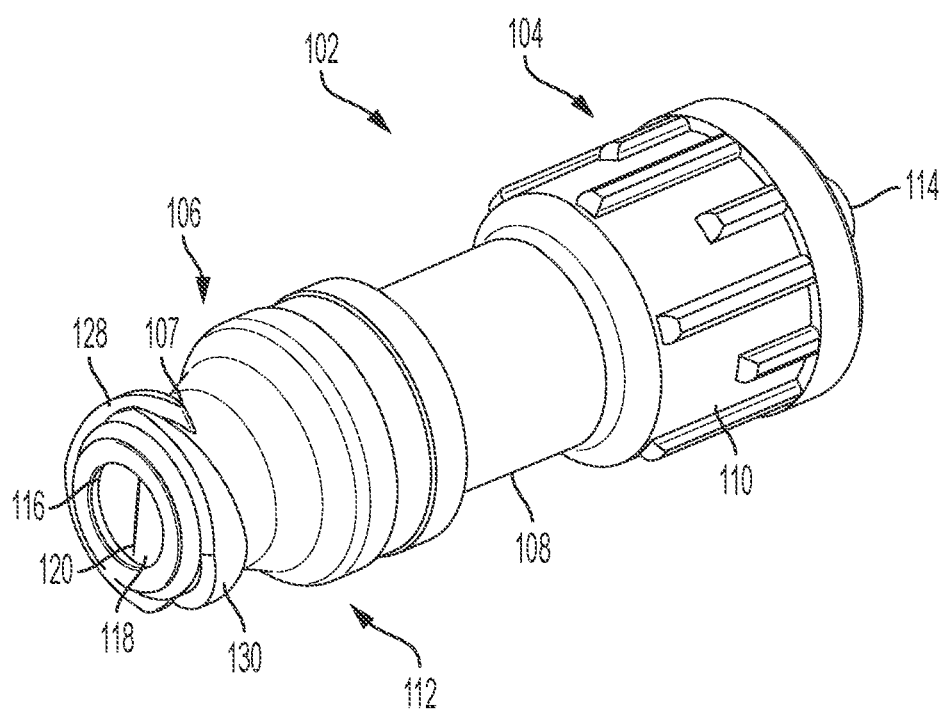
FIG. 1 is a perspective view of an exemplary medical connector or NFC, as is known in the prior art.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present disclosure is directed to a multiuse disinfection cap assembly 202 configured to be connected to different types of medical connectors 102, such as NFCs or hubs, ports, or valves for a VAD, to prevent the connector, NFC, or VAD from being contaminated by, for example, microbes, debris, or other contaminants. Multiuse disinfection cap assembly 202 can be configured to clean or disinfect the surface of connector 102 or NFC, ensuring that connector 102 or NFC remains sterile prior to use. Multiuse disinfection cap assembly 202 can be configured to engage or be connected to different sizes, configurations, or types of medical connectors 102 or NFCs. For example, multiuse disinfection cap assembly 202 can be configured to engage or be connected to NFCs or connectors 102 of different designs, configurations, and sizes. In particular, multiuse disinfection cap assembly 202 can be configured for use with NFCs or connectors 102 having different body widths or arrangements of threads, such as threads with different inner or outer diameters or threads with different thread widths (e.g., threads having different widths at the crest and/or root of the thread).

As used herein, a needle free connector or "NFC" refers to a connector 102 comprising an opening or port 116 that is configured to be inserted in a tube or opening of another object or device having an inner diameter that is larger than an outermost diameter of the proximal end 106 of connector 102 in order to connect the object or device to the NFC or connector 102. Connector 102 can comprise an elongated tubular proximal portion 107 with a cover or septum 118 over the opening 116. An exemplary connector 102 including a septum 118 with a slit 120 is shown in FIG. 1. Connector 102 can be configured to be connected to or engage various types of objects or devices. Connector 102 or NFC can comprise a distal end 104 that comprises a male connector 110 comprising an elongated member, such as a tubular member or stem 114, configured to be inserted in a tube or opening having an inner diameter that is smaller than an outermost diameter of male connector 110.

As used herein, a "luer connector" refers to a connector that includes a tapered portion (e.g., a luer taper) for creating a friction engagement between a tapered stem 114 or elongated member of male luer connector 110 and a tapered cavity. Specifically, male luer connector 110 includes a tapered stem 114 or elongated member having a tapered outer surface. A female luer connector can include a tapered cavity configured to receive and engage the tapered stem or elongated member to connect male luer connector 110 to the female luer connector.

The proximal end 106 and male luer connector 110 of the NFC or connector 102 can include engaging structures, such as threads, for connecting connector 102 to other objects or devices. For example, as shown in FIG. 1, male luer connector 110 can include an annular shield 122 extending about tapered stem 114 or elongated member. Annular shield 122 can include threads 124 on an inner surface 126 of annular shield 122 configured to engage corresponding threads on an outer surface of a female luer connector (not shown). The NFC or connector 102 can comprise a female luer connector. For example, as shown in FIG. 1, the NFC or connector 102 includes threads 128 extending from the outer surface 130 positioned to engage threads on the inner surface of another object or device. Twisting the NFC or connector 102 can cause the corresponding threads 124, 128 to engage threads on other objects or devices, such as a syringe or a connector for tubing.

Figure 2:
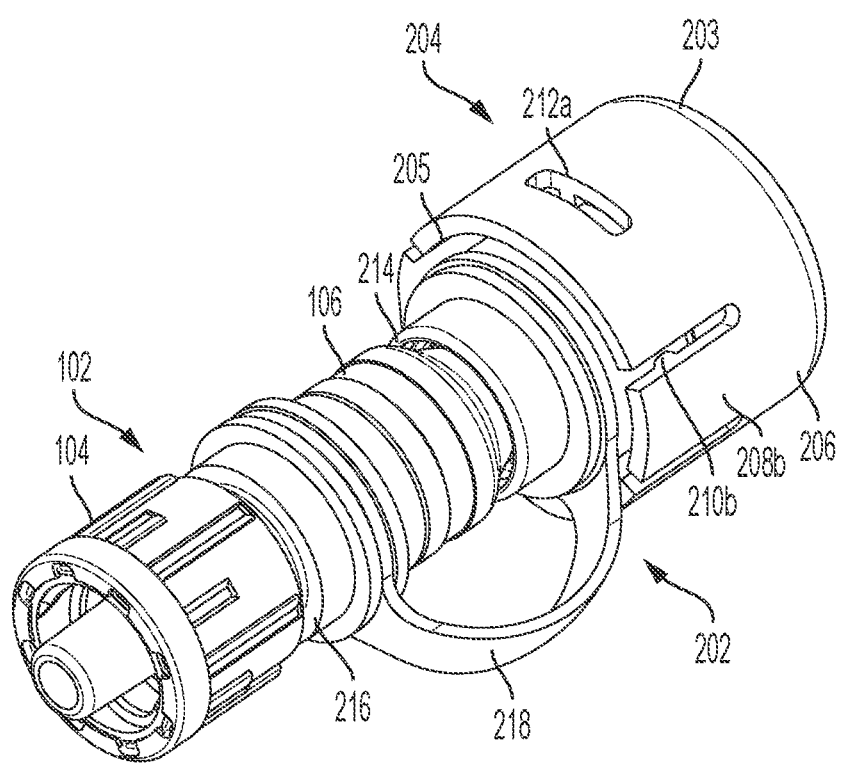
FIG. 2 is a perspective view of a multiuse disinfection cap assembly, according to an aspect of the present disclosure, connected to a prior art NFC.
Figure 3:
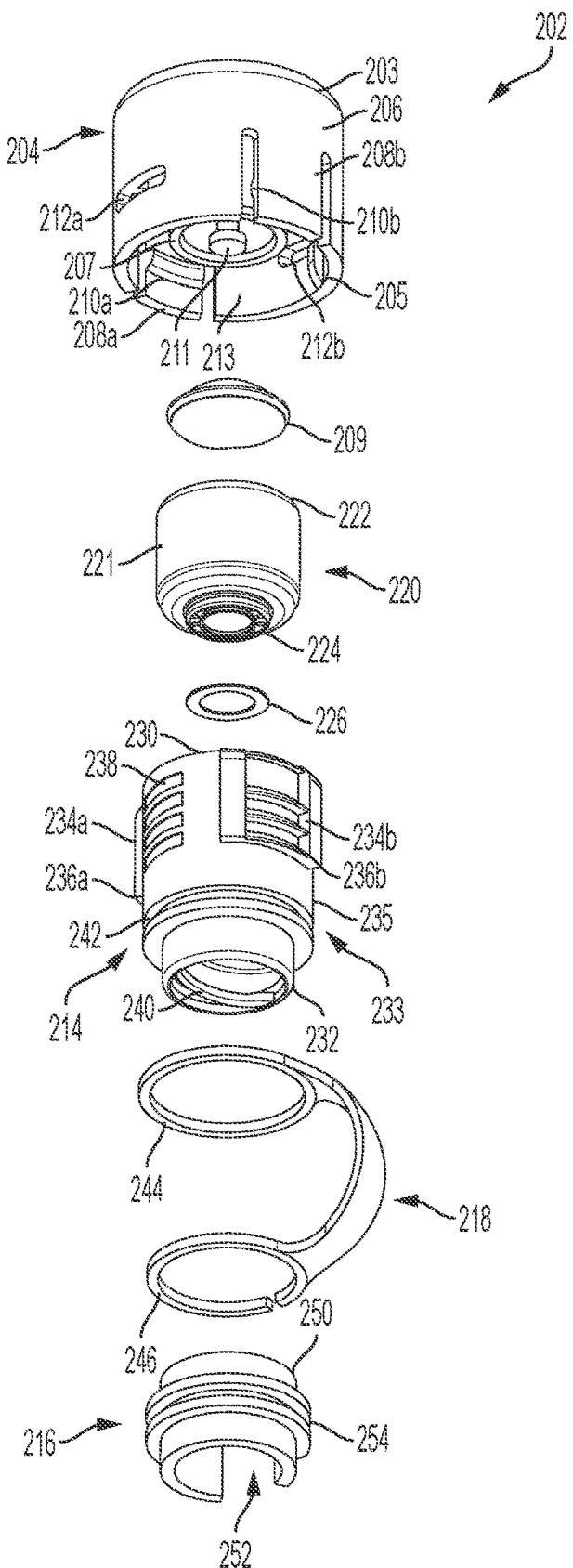
FIG. 3 is an exploded perspective view of a multiuse disinfection cap assembly, according to an aspect of the present disclosure.

With specific reference to FIG. 2, multiuse disinfection cap assembly 202 of the present disclosure can be configured to engage a variety of different configurations and orientations of NFCs or connectors 102, such as different types of needleless luer connectors, and can be used for all types of female luer connectors. As will be appreciated by those skilled in the art, there are numerous different commercially available medical devices, such as hubs, ports, and valves, which include different variations of connectors 102. Multiuse disinfection cap assembly 202 of the present disclosure can be configured to adapt or deform so that it can be secured to numerous different types and sizes of NFCs or connectors 102. For example, multiuse disinfection cap assembly 202 of the present disclosure can also be configured to cover different connector designs including, without limitation, the BD Q-Syte™, BD MaxZero™, BD MaxPlus™, and SmartSite™ needle free connectors by Becton Dickinson and Company. Multiuse disinfection cap assembly 202 can also be configured to be connected to connectors by other manufacturers.

FIGS. 2, 3, 4A, 4B, 6A, and 6B illustrate an exemplary multiuse disinfection cap assembly 202 configured to engage and/or to be connected to NFCs or connectors 102. In particular, multiuse disinfection cap assembly 202 can be configured to be used with NFCs or connectors 102 with different dimensions and/or different arrangements of threads 128 on the outer surface of the proximal end 106 of the NFC or connector 102. In some examples, multiuse disinfection cap assembly 202 of the present disclosure is configured to cover and seal the proximal end 106 of the NFC or connector 102 to prevent microbial ingress into connector 102. In addition, multiuse disinfection cap assembly 202 can include components, such as a chamber 220 (e.g., a spray chamber) holding disinfectant for cleaning and disinfecting portions of connector 102.

As shown in FIGS. 2, 3, 4A, 4B, 6A, and 6B, multiuse disinfection cap assembly 202 may comprise, in some embodiments or aspects of the present disclosure, a cap 204, a chamber 220, a housing 214, a strap 218, and a gripper 216. Cap 204 may generally comprise a cup-shaped container defining a cylindrical space. Cap 204 may comprise a closed top 203, an open bottom 205, and a first sidewall 206 (e.g., a cylindrical wall, which may have breaks therein) that extends between top 203 of cap 204 and bottom 205 of cap 204. First sidewall 206 may comprise one or more ridges 210a. 210b (e.g., teeth, threads) on an interior surface 213 of first sidewall 206. Each ridge 210a, 210b may be formed on an interior surface 213 of a flexible portion 208a. 208b of first sidewall 206 (e.g., an extension flanked by breaks in sidewall 206 to allow flexible portion 208a, 208b to flexibly deflect away from center of cap 204 as ridge 210a, 210b slides over corresponding ridges 236a. 236b on housing 214). Cap 204 may further comprise a center arm 211 that extends from a center of top 203 of cap 204 toward a center of bottom 205 of cap 204. Cap 204 may be dimensioned to slidably cover exterior surface 235 of housing 214, to provide a conforming fit that allows ridges 210a, 210b, 236a, 236b to interact and interlock, while also permitting movement and preventing cap 204 from being prematurely removed.

Housing 214 may comprise an open top 230, an open bottom 232, and a sidewall 233 extending between top 230 of housing 214 and bottom 232 of housing 214. Housing 214 may generally comprise a tube-shaped container defining a cylindrical space, with an upper portion to receive chamber 220 and a lower portion to connect to proximal end 106 of connector 102. The bounds of both the upper portion and lower portion of housing 214 may be referred to as sidewall 233. Sidewall 233 of housing 214 may comprise at least one set of a plurality of ridges 236a, 236b (e.g., a first set of a plurality of ridges 236a, a second set of a plurality of ridges 236b) (e.g., teeth, threads) on an exterior surface 235 of sidewall 233 of housing 214, which are parallel to the one or more ridges 210a, 210b on first sidewall 206 of cap 204, and which may be configured to engage, in sequence (e.g., one or a subset of plurality of ridges in a set of ridges 236a, 236b at a time, after another) with the one or more ridges 210a, 210b of first sidewall 206 of cap 204. Cap 204 may comprise a ridge 210a, 210b for each set of a plurality of ridges 236a, 236b; for example, a first ridge 210a may correspond to and engage with, in sequence, a first set of a plurality of ridges 236a, a second ridge 210b may correspond to and engage with, in sequence, a second set of a plurality of ridges 236a, and the like. As a ridge 210a, 210b begins to press downward against a ridge of a plurality of ridges 236a. 236b, flexible portion 208a, 208b of first sidewall 206 may flexibly deflect away from the plurality of ridges 236a, 236b, allowing a peak of ridge 210a. 210b to pass over a corresponding peak of a ridge of the plurality of ridges 236a, 236b. After the peak of ridge 210a, 210b passes over the corresponding peak of a ridge of the plurality of ridges 236a, 236b, the force of the flexed portion 208a, 208b of first sidewall 206 (e.g., in combination with the shape of the plurality of ridges 236a, 236b) may urge the peak of ridge 210a, 210b to come to a rest in a valley adjacent a peak of the ridge of the plurality of ridges 236a, 236b. In this manner, ridge 210a, 210b may incrementally progress downward over each ridge of the plurality of ridges 236a, 236b, with successive downward forces applied to cap 204 that cause flexible portion 208a, 208b to repeatedly deflect and allow ridge 210a, 210b to progress over a ridge of the plurality of ridges 236a, 236b, one at a time.

Chamber 220 may comprise an open top 222, a perforated bottom 224, and a sidewall 221 extending between top 222 of chamber 220 and bottom 224 of chamber 220. Chamber 220 may generally comprise a cup-shaped container defining a cylindrical space enclosed by sidewall 221. Chamber 220 may be attached to cap 204; for example, an upper portion of sidewall 221 may be attached to a lower portion of a second sidewall 207 of cap 204. In particular, sidewall 221 of chamber 220 may be slidably engaged with second sidewall 207 of cap 204 (see FIGS. 11A and 11B for further detail). Second sidewall 207 of cap 204 may be surrounded by first sidewall 206 of cap 204. Top 222 of chamber 220 may comprise an opening configured to allow center arm 211 of cap 204 to extend into chamber 220 and engage a stopper 209 located within chamber 220 that seals top 222 of chamber 220. Perforated bottom 224 of chamber 220 may contain a plurality of openings or perforations for transferring the disinfectant from the interior cylindrical space of chamber 220 to a surface of connector 102 when cap 204 is depressed. The size, number, and locations of the perforations in bottom 224 of chamber 220 can be determined (e.g., as required or desired) by the flow rate and volume of disinfectant to be dispensed. Bottom 224 of chamber 220 may comprise an annular groove configured to hold or retain an annular filter 226 to block air and prevent leakage of disinfectant from perforated bottom 224. In one example, filter 226 can be a 5-micron filter and hydrophobic. Multiuse disinfection cap assembly 202 comprising chamber 220 filled with disinfectant and sealed by stopper 209 is designed to provide disinfection action on connector 102 for multiple uses without contamination.

Cap 204 may be configured to enclose at least a portion of housing 214 and to be pushed in a downward direction (see, e.g., FIGS. 5A-5D) toward bottom 224 of chamber 220 a plurality of times. Each time cap 204 is pushed in the downward direction, a ridge 210a, 210b of first sidewall 206 may slide over a ridge of plurality of ridges 236a, 236b of sidewall 233 of housing 214 (e.g., in an incremental motion caused by interlocking teeth passing over one another, one at a time), to allow cap 204 to advance incrementally in the downward direction. Also, each time cap 204 is pushed in the downward direction, center arm 211 of cap 204 moves stopper 209 within chamber 220 to cause a disinfectant stored in chamber 220 to emit from (e.g., spray out) perforated bottom 224 of chamber 220 and onto connector 102.

In some non-limiting embodiments or aspects, each ridge of at least one ridge 210a, 210b of cap 204 and/or plurality of ridges 236a. 236b of housing 214 may be formed such that the profile of each ridge has a sloped side (e.g., a gradual heightening, along a straight and/or curved path, from a valley of the ridge to a peak of the ridge) and a walled side (e.g., a substantially perpendicular extension from the valley of the ridge to the peak of the ridge). The sloped sides of at least one ridge 210a, 210b and plurality of ridges 236a, 236b are configured to touch one another and allow the ridges 210a, 210b, 236a, 236b to slide past one another as cap 204 is pushed in a downward direction. The walled sides of at least one ridge 210a and plurality of ridges 236a. 236b are configured to touch one another and prevent the ridges 210a, 210b, 236a, 236b from sliding past one another as cap 204 is pulled in an upward direction. For example, each ridge of plurality of ridges 236a, 236b of sidewall 233 of housing 214 is shaped with a first side forming a slope configured to allow at least one ridge 210a, 210b of first sidewall 206 of cap 204 to slide over the ridge of plurality of ridges 236a, 236b in the downward direction, and is further shaped with a second side forming a wall to prevent at least one ridge 210a, 210b of first sidewall 206 of cap 204 from sliding over the ridge of plurality of ridges 236a, 236b in an upward direction opposite the downward direction. By way of further example, each ridge of at least one ridge 210a, 210b of first sidewall 206 of cap 204 is shaped with a first side forming a slope configured to allow the ridge of at least one ridge 210a. 210b to slide over plurality of ridges 236a, 236b of sidewall 233 of housing 214 in the downward direction, and is further shaped with a second side forming a wall to prevent the ridge of at least one ridge 210a, 210b from sliding over plurality of ridges 236a, 236b of sidewall 233 of housing 214 in an upward direction opposite the downward direction.

In some non-limiting embodiments or aspects, plurality of ridges 236a, 236b may each be comprised in a channel 234a. 234b on sidewall 233 of housing 214. For example, a first channel 234a may comprise a first set of plurality of ridges 236a, and a second channel 234a may comprise a second set of plurality of ridges 236b. Each channel 234a, 234b may be configured to receive at least one ridge 210a. 210b of cap 204, so that as cap is pushed in a downward direction, at least one ridge 210a. 210b is bounded by channel 234a, 234b in the rotational direction and guided within channel 234a, 234b in the downward direction, preventing some or substantially all rotational movement of cap 204 while uses of disinfectant remain in chamber 220. After cap 204 is pushed a final time of a plurality of times of disinfection (e.g., in which case chamber 220 cannot be activated further), at least one ridge 210a. 210b may slide over a final ridge of plurality of ridges 236a, 236b (e.g., the ridge of plurality of ridges 236a, 236b most distal to top 203 of cap 204) and escape its respective channel 234a, 234b, to allow cap 204 to be rotated. After at least one ridge 210a. 210b has escaped the channels 234a, 234b, cap 204 may be rotated and removed from housing 214 (see FIGS. 10A-10C), and cap 204 and chamber 220 may be further replaced with a new and unused cap 204 and chamber 220. The first set of plurality of ridges 236a (e.g., within a first channel 234a) may be positioned on sidewall 233 of housing 214 opposite of the second set of plurality of ridges 236b (e.g., within a second channel 234b), to allow cap 204 to be fixed upon housing 214 via at least one ridge 210a, 210b (which are likewise spaced on opposite sides of first sidewall 206 of cap 204), so as to prevent a hinging motion of cap 204 due to an asymmetric or singular connection of cap 204 upon housing 214.

In some non-limiting embodiments or aspects, cap 204 and chamber 220, along with other components of multiuse disinfection cap assembly 202, can be disposable, e.g., formed from thin sheets or layers of an inexpensive material, such as a hard plastic, which can be disposed of after the multiple uses of disinfectant stored in chamber 220 are expended. Chamber 220 may be configured to contain disinfectant before it is assembled into multiuse disinfection cap assembly 202. In some non-limiting embodiments or aspects, the disinfectant can comprise a solution of chlorhexidine digluconate (CHG) and isopropyl alcohol (IPA). The disinfectant can be an antimicrobial, anti-fungal, antibacterial, and/or antiviral solution that cleans and sterilizes the surface of connector 102. In particular, the disinfectant is used to clean and disinfect surfaces of the proximal end 106, opening or port 116, and septum 118 of connector 102.

Cap 204 may comprise one or more windows 212a, 212b in first sidewall 206 of cap 204 to allow a viewer to see through first sidewall 206 and to housing 214 covered by cap 204. Housing 214 may comprise a plurality of visual indicia 238 (e.g., symbols, letters, numbers, colors, patterns, etc.) on exterior surface 235 of sidewall 233 of housing 214. Plurality of visual indicia 238 may be associated with a number of uses of multiuse disinfection cap assembly 202 (e.g., numbers representing a number of remaining uses, numbers representing a number of uses of disinfectant, colors representing a number of uses remaining or expended, etc.). Each time cap 204 is pushed and disinfectant is emitted from chamber 220, first sidewall 206 of cap 204 may move over exterior surface 235 of sidewall 233 of housing 214 to reveal a different visual indicium of plurality of visual indicia 238 via window 212a, 212b. In some non-limiting embodiments or aspects, each window 212a. 212b may be associated with a respective set of visual indicia 238 (e.g., with a second set of visual indicia 238 on an opposite side of housing 214 hidden from view in FIG. 3, but corresponding to a second window 212b). Window 212a, 212b may be shaped such that one visual indicium of plurality of visual indicia 238 is viewable at a time, or such that additional visual indicia of plurality of visual indicia 238 become viewable with each successive push of cap 204.

Figure 4A:
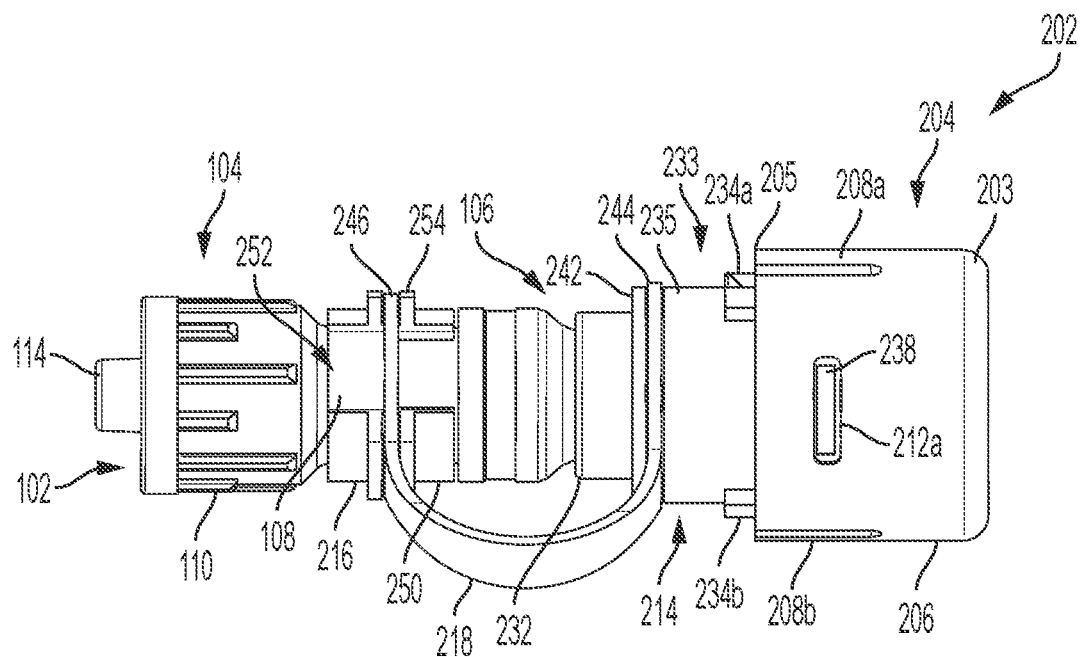
FIG. 4A is a side view of a multiuse disinfection cap assembly, according to an aspect of the present disclosure.
Figure 4B:
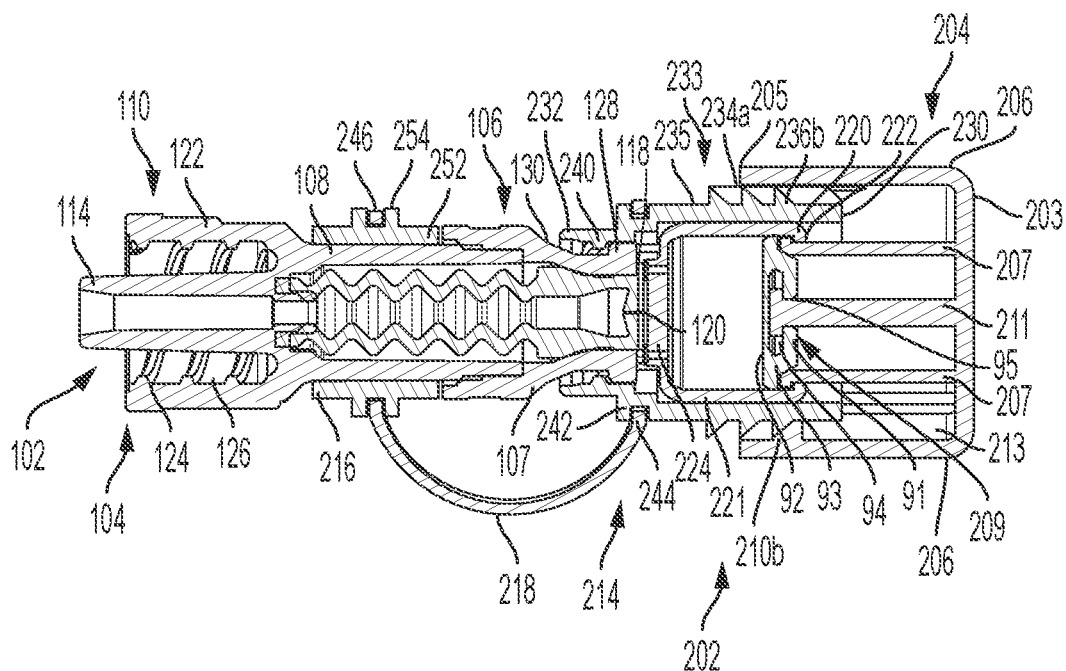
FIG. 4B is a cross-sectional view of the multiuse disinfection cap of FIG. 4A, according to an aspect of the present disclosure.
Figure 5A:
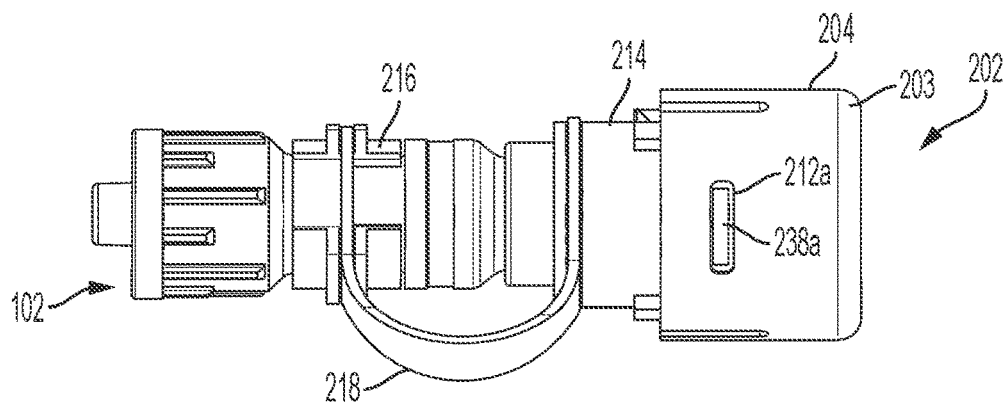
FIG. 5A is a perspective view of a multiuse disinfection cap assembly in a first position associated with a full disinfectant chamber, prior to the cap being pushed, according to an aspect of the present disclosure.
Figure 5B:
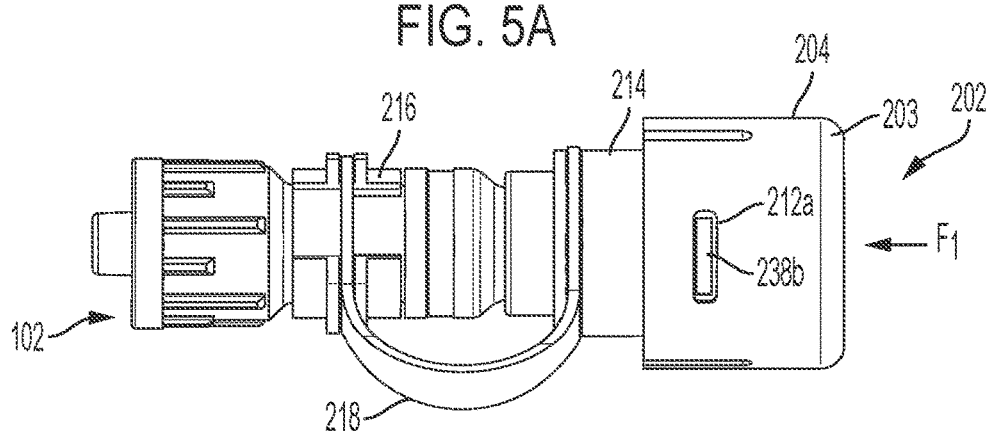
FIG. 5B is a perspective view of a multiuse disinfection cap assembly in a second position associated with a partially full disinfectant chamber, after a first push of the cap from the first position shown in FIG. 5A, according to an aspect of the present disclosure.
Figure 5C:
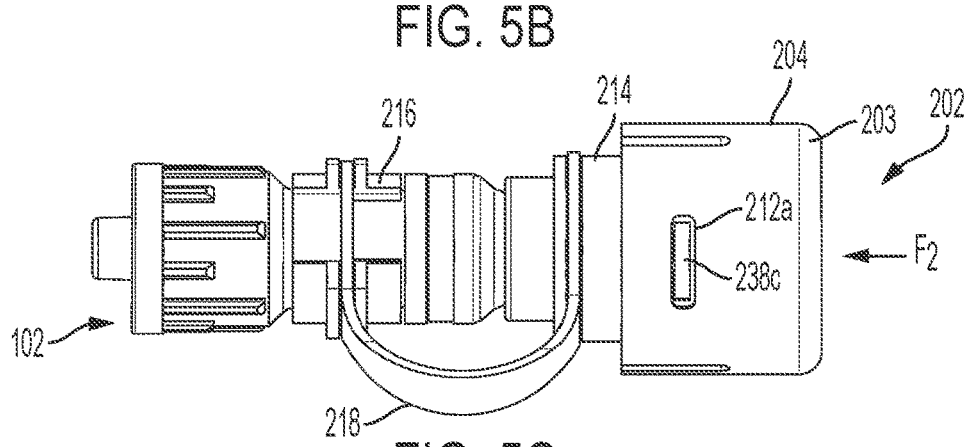
FIG. 5C is a perspective view of a multiuse disinfection cap assembly in a third position associated with a partially full disinfectant chamber, after a second push of the cap from the second position shown in FIG. 5B, according to an aspect of the present disclosure.
Figure 5D:
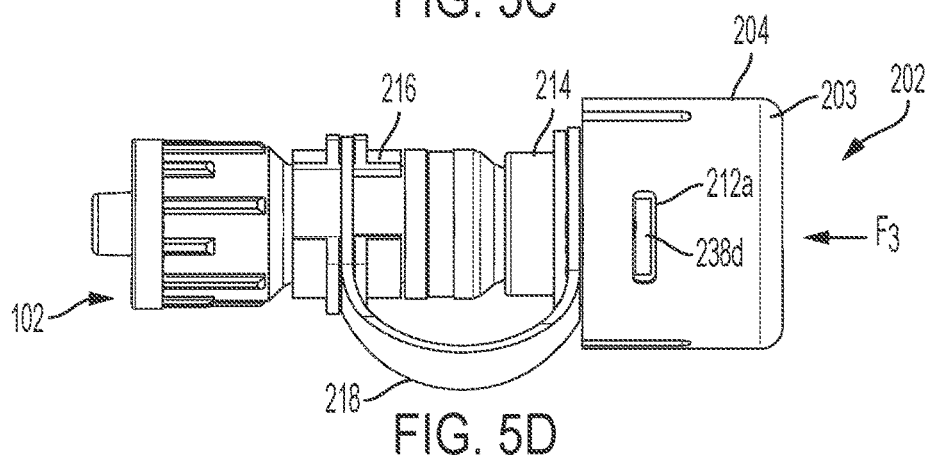
FIG. 5D is a perspective view of a multiuse disinfection cap assembly in a fourth position associated with a spent disinfectant chamber, after a third push of the cap from the third position shown in FIG. 5C, according to an aspect of the present disclosure.
Figure 11A:
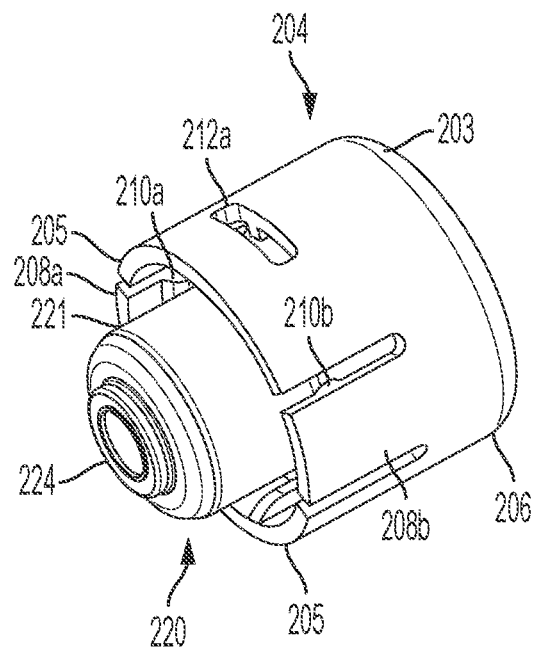
FIG. 11A is a perspective view of a cap and chamber of a multiuse disinfection cap assembly, according to an aspect of the present disclosure.
Figure 11B:
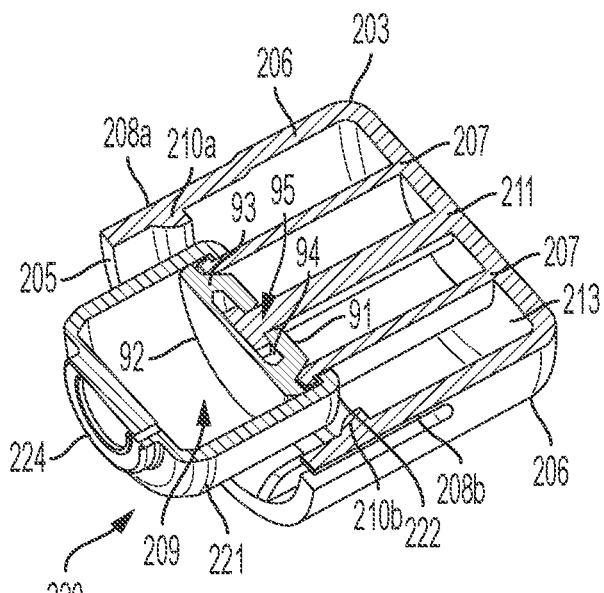
FIG. 11B is a cross-sectional view of the perspective view shown in FIG. 11A of a cap and chamber of a multiuse disinfection cap assembly, according to an aspect of the present disclosure.

As shown in FIG. 4B and FIG. 11B, stopper 209 may comprise a top circular disk 91, a bottom circular disk 92, and a sidewall 93 extending between top disk 91 and bottom disk 92, forming a hollow interior space or pocket 94 between top disk 91 and bottom disk 92. An opening or hole 95 is formed or machined into and through top disk 91. Stopper 209 is initially assembled into top 222 of chamber 220, as shown in FIG. 11B. Stopper 209 is held in position in chamber 220 by a friction fit against the interior of sidewall 221 of chamber 220 in the interior cylindrical space of chamber 220. Stopper 209 is positioned and fitted within chamber 220 to contain the disinfectant and prevent leakage of the disinfectant through open top 222 of chamber 220. Stopper 209 may act like a syringe mechanism that performs a function of pushing the disinfectant out of the interior cylindrical space of chamber 220 in which it is held, through the perforations in bottom 224 of chamber 220, and through filter 226 and onto the surface of the NFC or connector 102. Stopper 209 is pushed through the interior of chamber 220 by the action of the bottom tip of center arm 211 of cap 204, which can be inserted through hole 95 in top circular disk 91 of stopper 209, such that it is locked in place within pocket 94 in stopper 209 (see, e.g., FIG. 11B), and such that the movement of cap 204 and center arm 211 also moves stopper 209 through the interior space of chamber 220 when cap 204 is pushed.

Now referring to FIGS. 5A-5D, depicted is an illustrative example of a four-stage multiuse disinfection cap assembly 202, in which chamber 220 contains sufficient disinfectant for three dispersals and pushes of cap 204. It will be appreciated that, using the same principles described herein, multiuse disinfection cap assembly 202 may be configured for more or fewer stages, wherein multiuse disinfection cap assembly 202 may be configured for more or fewer uses of disinfectant. For example, housing 214, chamber 220, and cap 204 may be elongated to provide for additional volume therein, and housing 214 may be provided with additional ridges of plurality of ridges 236a, 236b, to allow for additional activations of multiuse disinfection cap assembly 202. Conversely, housing 214, chamber 220, and cap 204 may be shortened to provide for less volume therein, and housing 214 may be provided with fewer ridges of plurality of ridges 236a, 236b, to allow for fewer activations of multiuse disinfection cap assembly 202.

In some non-limiting embodiments or aspects, when chamber 220 is filled at its maximum volume with disinfectant and cap 204 has yet to be depressed for a first time (see FIG. 5A), window 212a, 212b may reveal a first visual indicium of plurality of visual indicia 238 associated with a first stage of use (e.g., showing the color red to represent that the cap should not be removed yet because disinfectant and uses remain). Pressing cap 204 with a first force ($F_1$) may cause cap 204 to slidably move over housing 214, wherein at least one ridge 210a, 210b of cap 204 slides over at least one ridge of plurality of ridges 236a, 236b and comes to a rest after peaks of respective ridges 210a, 210b, 236a, 236b pass one another and flexible portion 208a, 208b returns to an unflexed position. The pressing of cap 204 with a first force ($F_1$) also causes center arm 211 to push stopper 209 inside chamber 220 to cause a first emission of disinfectant on connector 102. The first force ($F_1$) causes multiuse disinfection cap assembly 202 to progress from a first stage (shown in FIG. 5A) to a second stage (shown in FIG. 5B).

In some non-limiting embodiments or aspects, after cap 204 has been pushed with a first force ($F_1$) (see FIG. 5B), window 212a, 212b may reveal a second visual indicium of plurality of visual indicia 238 associated with a second stage of use (e.g., showing the color yellow to represent that the cap should not be removed yet because disinfectant and uses remain, but chamber 220 is not entirely full). Pressing cap 204 with a second force ($F_2$) may cause cap 204 to slidably move over housing 214, wherein at least one ridge 210a, 210b of cap 204 slides over at least one ridge of plurality of ridges 236a, 236b and comes to a rest after peaks of respective ridges 210a, 210b, 236a, 236b pass one another and flexible portion 208a, 208b returns to an unflexed position. The pressing of cap 204 with a second force ($F_2$) also causes center arm 211 to push stopper 209 further inside chamber 220 to cause a second emission of disinfectant on connector 102. The second force ($F_2$) causes multiuse disinfection cap assembly 202 to progress from a second stage (shown in FIG. 5B) to a third stage (shown in FIG. 5C).

In some non-limiting embodiments or aspects, after cap 204 has been pushed with a second force ($F_2$) (see FIG. 5C), window 212a, 212b may reveal a third visual indicium of plurality of visual indicia 238 associated with a third stage of use (e.g., showing the color blue to represent that the cap should not be removed yet because disinfectant and uses remain, but chamber 220 is almost empty). Pressing cap 204 with a third force ($F_3$) may cause cap 204 to slidably move over housing 214, wherein at least one ridge 210a, 210b of cap 204 slides over at least one ridge of plurality of ridges 236a, 236b and comes to a rest after peaks of respective ridges 210a, 210b, 236a, 236b pass one another and flexible portion 208a, 208b returns to an unflexed position. The pressing of cap 204 with a third force ($F_3$) also causes center arm 211 to push stopper 209 further inside chamber 220 to cause a third emission of disinfectant on connector 102. The third force ($F_3$) causes multiuse disinfection cap assembly 202 to progress from a third stage (shown in FIG. 5C) to a fourth stage (shown in FIG. 5D).

In some non-limiting embodiments or aspects, after cap 204 has been pushed with a third force ($F_3$) (see FIG. 5D), window 212a, 212b may reveal a fourth visual indicium of plurality of visual indicia 238 associated with a fourth stage of use (e.g., showing the color green to represent that the cap can be removed because no disinfectant and/or uses remain). Cap 204 and housing 214 may be shaped relative to one another such that, after a final use, cap 204 cannot be depressed further. After the final use, ridge 210a, 210b of cap 204 may slide over a final ridge of plurality of ridges 236a, 236b and may escape a channel 234a, 234b comprising the plurality of ridges 236a, 236b of housing 214, thereby allowing the cap 204 to rotate to a position where at least one ridge 210a, 210b no longer contacts plurality of ridges 236a, 236b. Cap 204 and chamber 220 may be removed from housing 214 by rotating cap 204 so that at least one ridge 210a, 210b is clear of plurality of ridges 236a, 236b and cap 204 can be removed from housing 214 (see FIGS. 10A-10C).

Figure 6A:
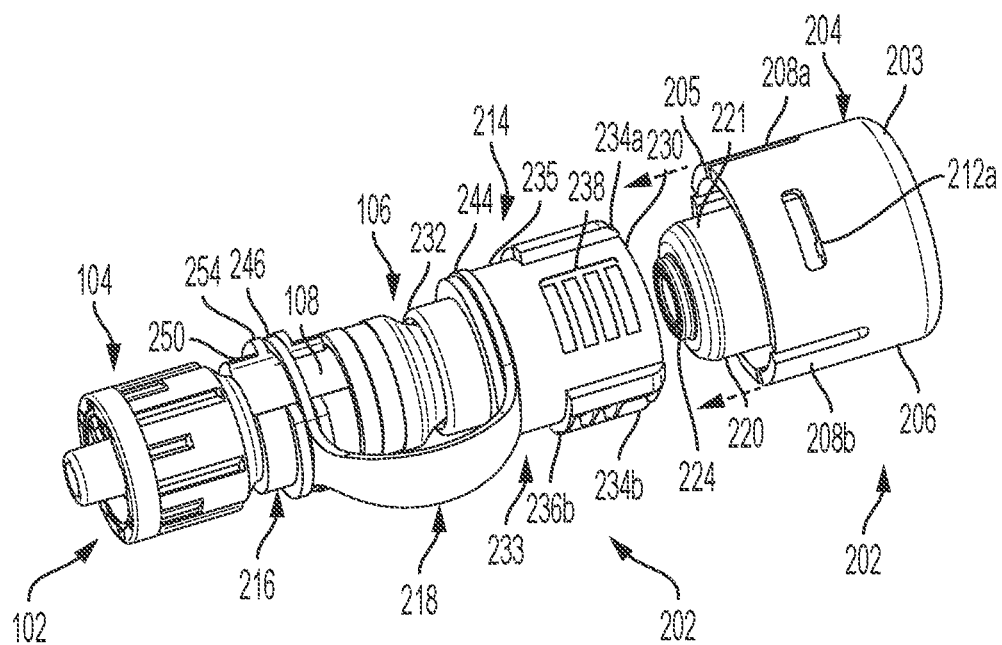
FIG. 6A is a perspective view of a multiuse disinfection cap assembly in which the cap and chamber are spaced apart from the housing and can be brought together, according to an aspect of the present disclosure.
Figure 6B:
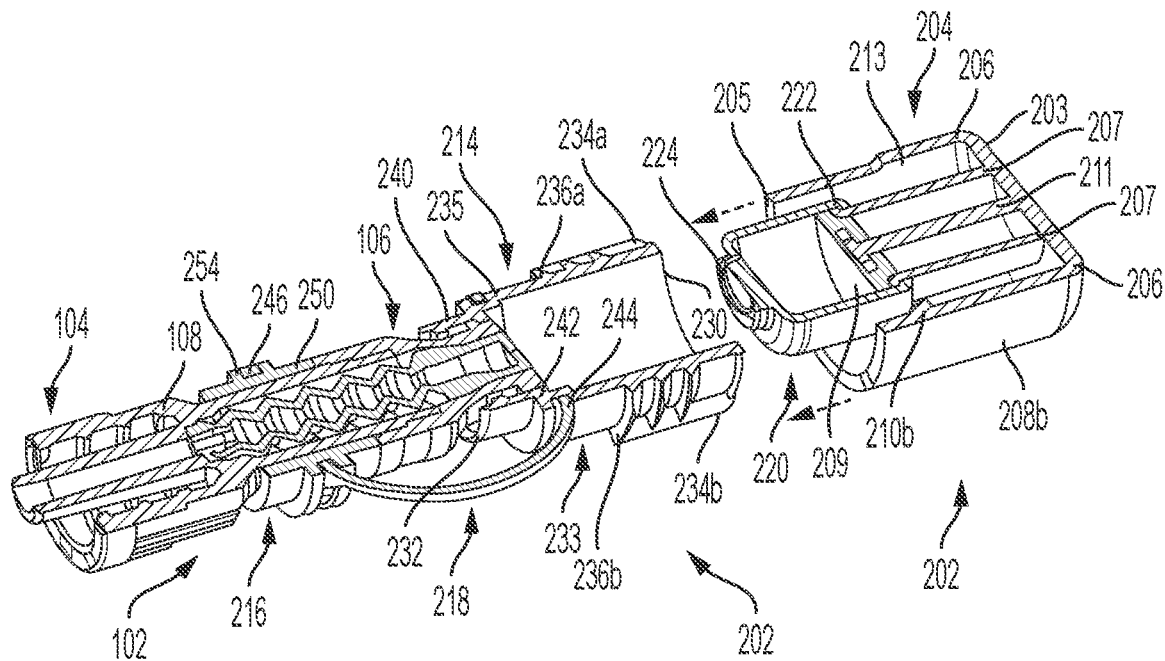
FIG. 6B is a cross-sectional view of the perspective view shown in FIG. 6A of a multiuse disinfection cap assembly in which the cap and chamber are spaced apart from the housing and can be brought together, according to an aspect of the present disclosure.
Figure 12A:
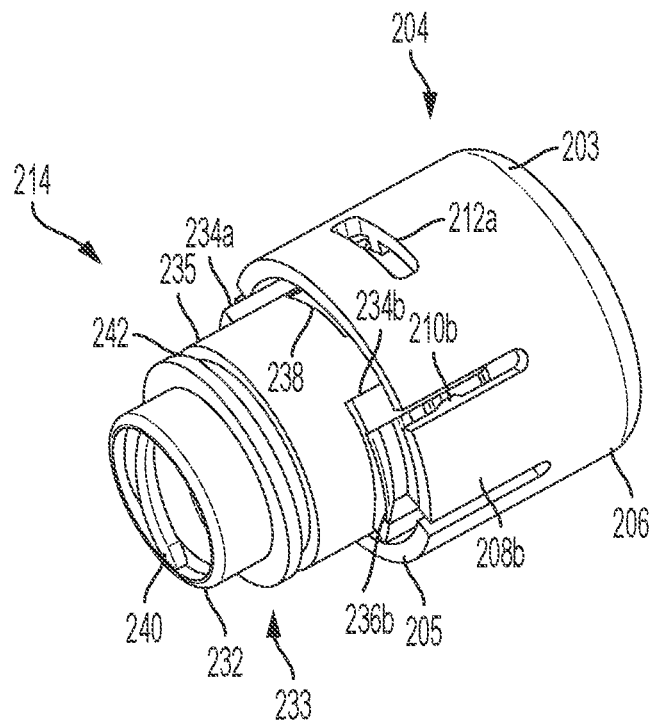
FIG. 12A is a perspective view of a cap, chamber, and housing of a multiuse disinfection cap assembly, according to an aspect of the present disclosure.
Figure 12B:
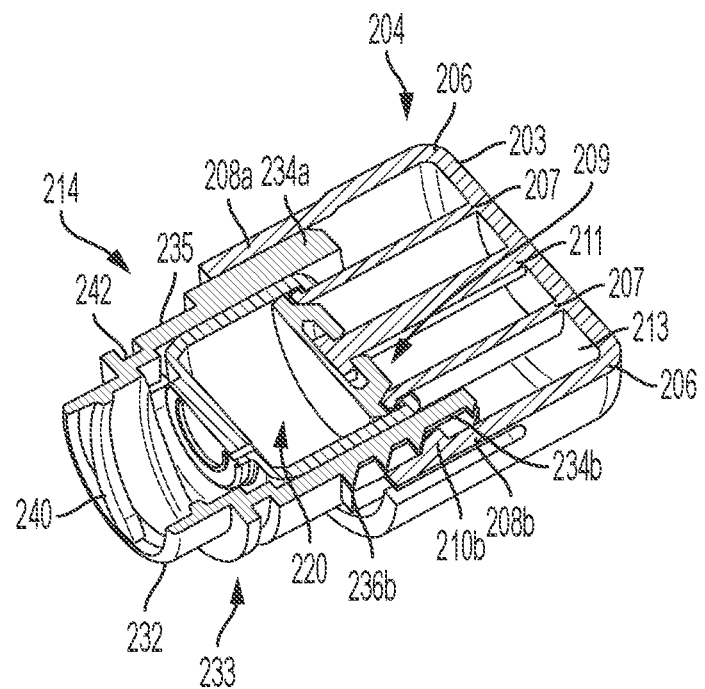
FIG. 12B is a cross-sectional view of the perspective view shown in FIG. 12A of a cap, chamber, and housing of a multiuse disinfection cap assembly, according to an aspect of the present disclosure.
Figure 13:
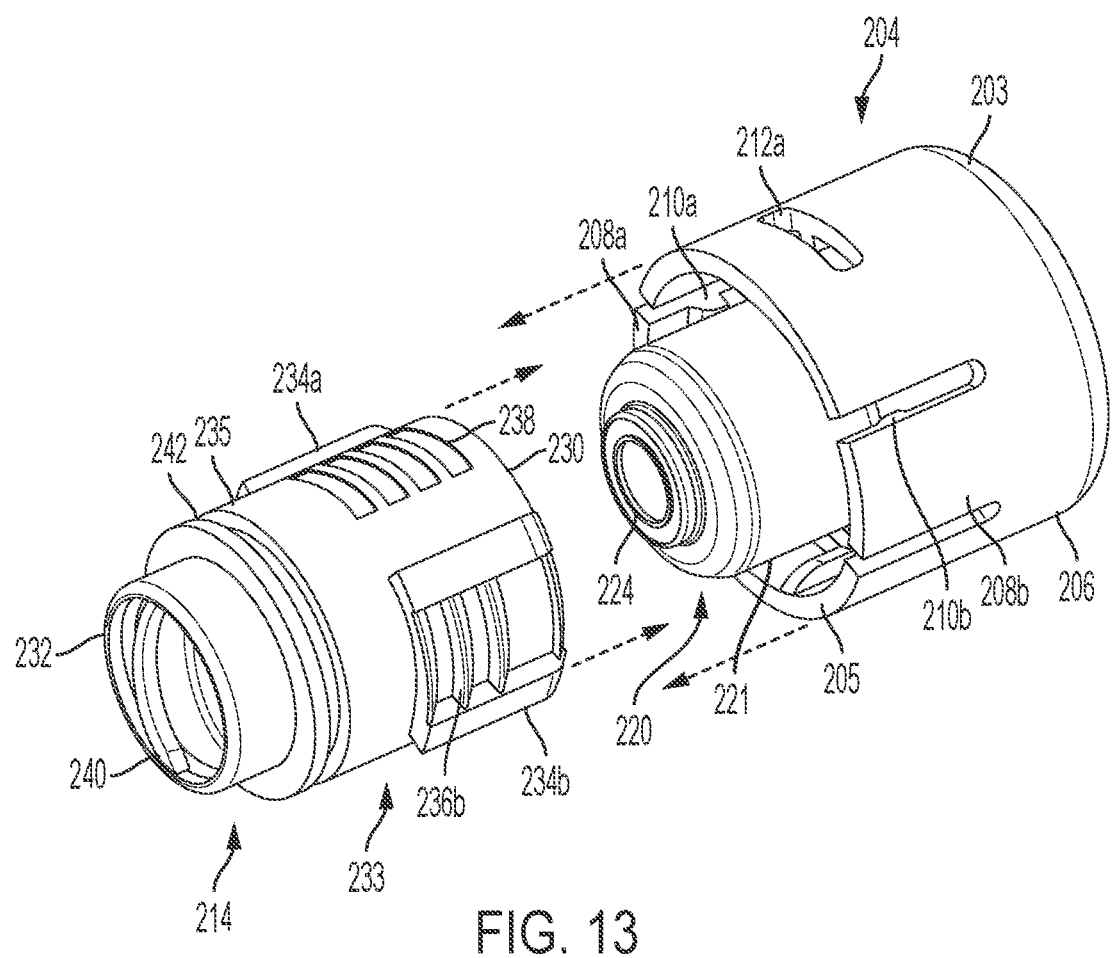
FIG. 13 is a perspective view of a cap, chamber, and housing of a multiuse disinfection cap assembly, in which the housing is disassembled from the cap and chamber, according to an aspect of the present disclosure.

With specific reference to FIGS. 6A, 6B, 12A, 12B, and 13, in some non-limiting embodiments or aspects, depicted is a method of connecting cap 204 and chamber 220 to housing 214, of multiuse disinfection cap assembly 202. The steps of assembly described in connection with FIGS. 6A and 6B may be initially performed by a manufacturing personnel. Additionally or alternatively, the steps of assembly described in connection with FIGS. 6A and 6B may be performed by a practitioner the first time, and each subsequent time, a new cap 204 and chamber 220 are needed for use in multiuse disinfection cap assembly 202. FIG. 6A provides an illustrative perspective view of cap 204 and chamber 220 to be placed over and in housing 214, respectively. FIG. 6B provides the same perspective view of FIG. 6A, but with an additional cross-sectional plane. FIG. 13 provides a close-up perspective view of only the cap 204, chamber 220, and housing 214 from FIG. 6A. FIG. 12A provides a close-up perspective view of cap 204 and chamber 220 placed over and in house 214, respectively. FIG. 12B provides the same perspective view of FIG. 12A, but with an additional cross-sectional plane.

To connect cap 204 and chamber 220 to housing 214, a practitioner may apply a downward pressure to cause first sidewall 206 of cap 204 to contact sidewall 233 of housing 214. First sidewall 206 of cap 204 may contact sidewall 233 of housing 214 by way of at least one ridge 210a, 210b of first sidewall 206 contacting a first ridge of plurality of ridges 236a, 236b of sidewall 233. When at least one ridge 210a, 210b contacts the first ridge of plurality of ridges 236a, 236b, a practitioner may be met with a slight resistance as flexible portion 208a, 208b of first sidewall 206 that is associated with at least one ridge 210a, 210b is urged into a flexed position. In such a case, at least one ridge 210a, 210b and flexible portion 208a, 208b is deflected away from sidewall 233 of housing 214, as at least one ridge 210a. 210b begins and continues to slide over the first ridge of plurality of ridges 236a, 236b. After the peak of at least one ridge 210a, 210b passes the peak of the first ridge of plurality of ridges 236a, 236b, flexible portion 208a, 208b may return to an unflexed (or less flexed) position by action of the elasticity of flexible portion 208a, 208b. After the at least one ridge 210a, 210b has slid over the first ridge of plurality of ridges 236a, 236b, the walled side of at least one ridge 210a, 210b will be facing the walled side of the first ridge of plurality of ridges 236a, 236b, initially preventing cap 204 from being pulled off of housing 214 in the upward direction (see FIGS. 12A and 12B). After initial attachment of cap 204, window 212a, 212b of first sidewall 206 of cap 204 may reveal a first visual indicium of plurality of visual indicia 238a, 238b, which may indicate that chamber 220 is full and ready to be activated for a first use (see FIG. 5A). Chamber 220 is shaped with a diameter being less than a diameter of sidewall 233 of housing 214, so that chamber 220 may slide into place within housing 214. Sidewall 233 of housing 214 is shaped with a diameter less than first sidewall 206 of cap 204 but greater than second sidewall 207 of cap 204, so as to slide into place between second sidewall 207 and first sidewall 206 of cap 204.

With specific reference to FIGS. 7, 8, 9A-9D, 14A, and 14B, in some non-limiting embodiments or aspects, depicted is a method of connecting multiuse disinfection cap assembly 202 to connector 102. While the depicted method is illustrated with a specific configuration of connector 102, it will be appreciated that gripper 216, strap 218, and housing 214 may be resized to function according to the principles described herein, to accommodate connectors 102 of various and/or different sizes. The steps of assembly described in connection with FIGS. 7, 8, and 9A-9D may be performed by a practitioner after connector 102 is in place on a patient. Additionally or alternatively, connector 102 may be placed on a patient with multiuse disinfection cap assembly 202 pre-attached to connector 102, in which case a manufacturing personnel may perform the steps of assembly described in connection with FIGS. 7, 8, and 9A-9D. In order to connect multiuse disinfection cap assembly 202 to a NFC or connector 102, such as a female connector 112 shown in FIG. 8, the practitioner first removes any packaging from multiuse disinfection cap assembly 202.

Figure 7:
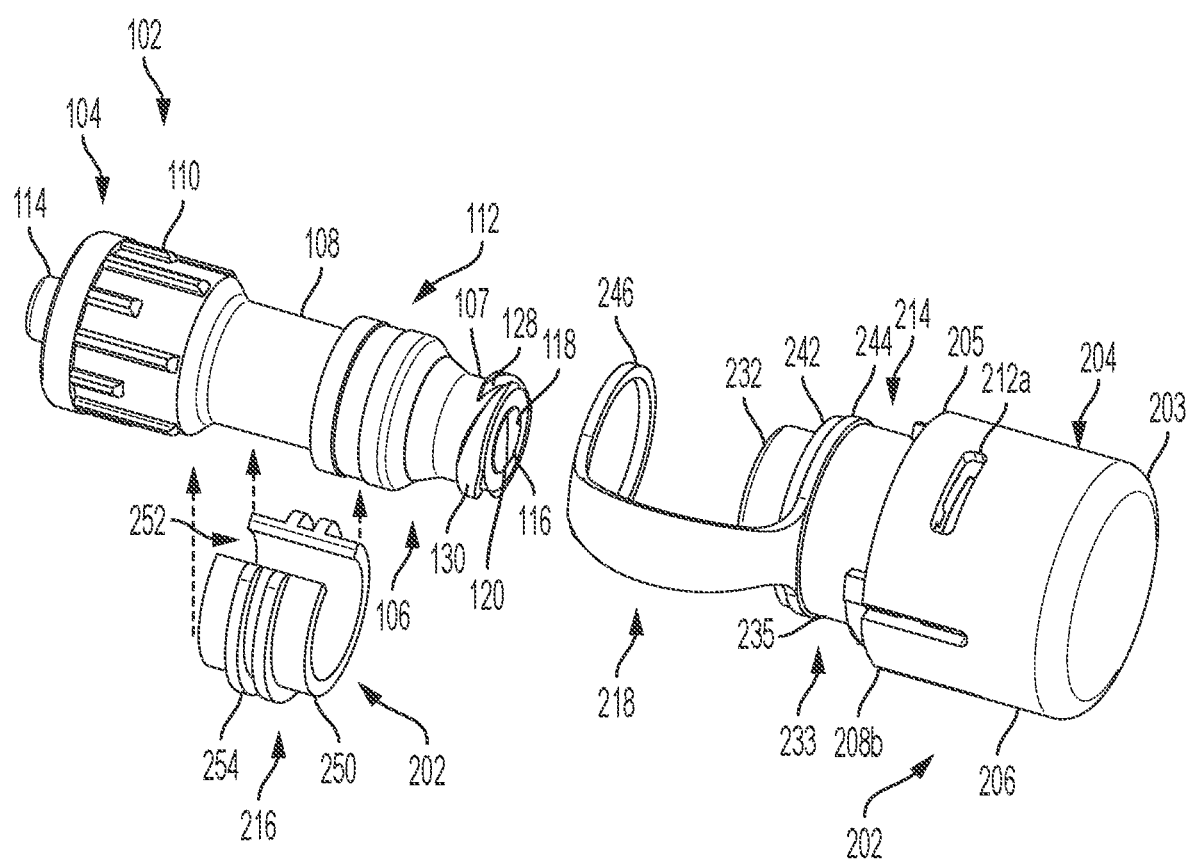
FIG. 7 is a perspective view of a first step in a process for attaching a multiuse disinfection cap assembly to a prior art NFC, according to an aspect of the present disclosure.

Referring to FIG. 7, depicted is a housing 214 that has been previously connected to a cap 204 and chamber 220. It will be appreciated, however, that the illustrated method of assembly may also be conducted before cap 204 and chamber 220 have been connected to housing 214 (via a method depicted in FIGS. 6A and 6B). As shown, multiuse disinfection cap assembly 202 may comprise a gripper 216 that may be removably attached to connector 102. Gripper 216 may comprise a curved wall 250 comprised of a flexible polymer in the shape of an unconnected ring (e.g., an uncompleted cylindrical body), wherein curved wall 250 comprises an opening 252 in a circumference of curved wall 250. A width of opening 252 may be configured to be smaller than a width of a body 108 of connector 102, such that gripper 216 may be flexibly snapped onto body 108 of connector 102. In such an attachment process, opening 252 of curved wall 250 may be temporarily widened as body 108 presses through opening 252 and against curved wall 250, allowing body 108 to pass through opening 252 and into the inside bounds of curved wall 250. Once body 108 has passed through opening 252, opening 252 may narrow as gripper 216 unflexes (at least partly), so as to contain body 108 of connector 102 in curved wall 250. When inside, body 108 of connector 102 may engage an interior of curved wall 250 of gripper 216, holding connector 102 snugly in place within gripper 216. A width of gripper 216 may be shaped to fit within a width of body 108 of connector 102, so that gripper 216 does not slide in a longitudinal direction along connector 102 once gripper 216 is attached to connector 102. FIG. 7 depicts gripper 216 before being attached to connector 102, and FIG. 8 depicts gripper 216 after being attached to connector 102.

Figure 8:
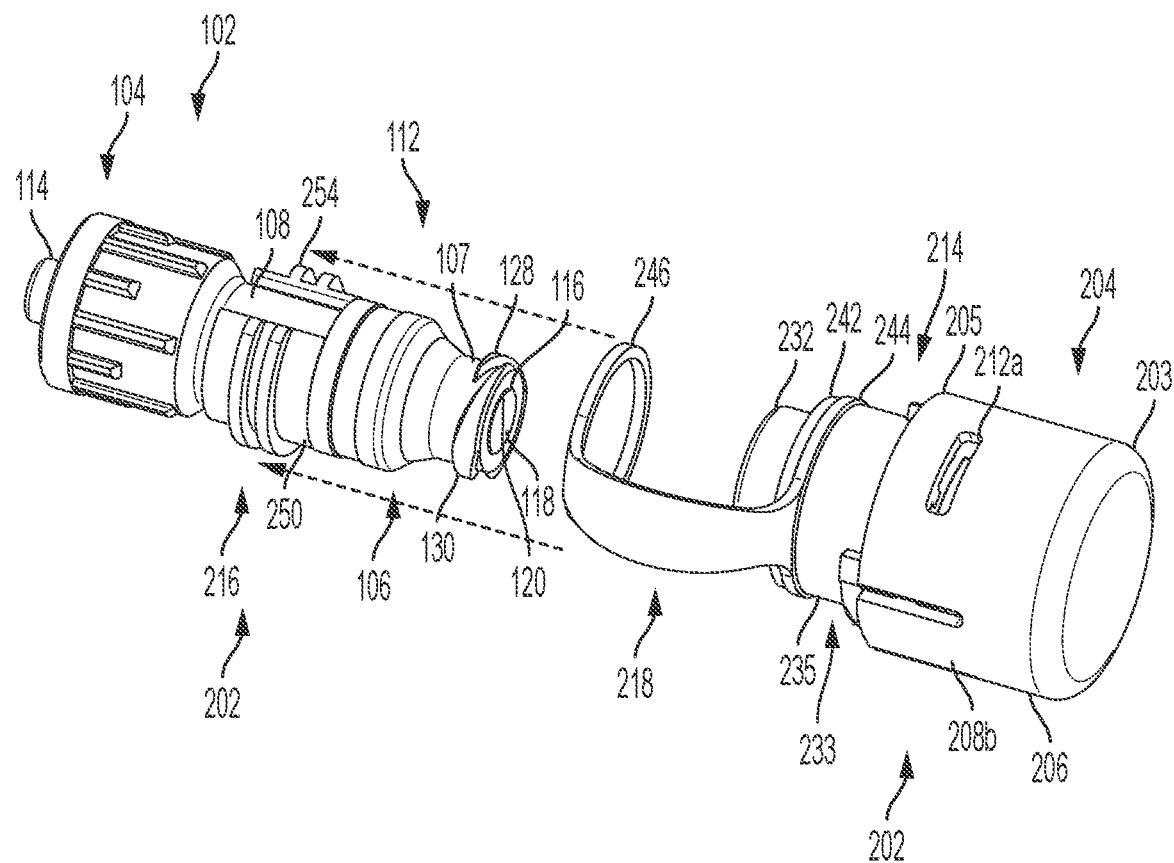
FIG. 8 is a perspective view of a second step in a process for attaching a multiuse disinfection cap assembly to a prior art NFC, according to an aspect of the present disclosure.
Figure 14A:
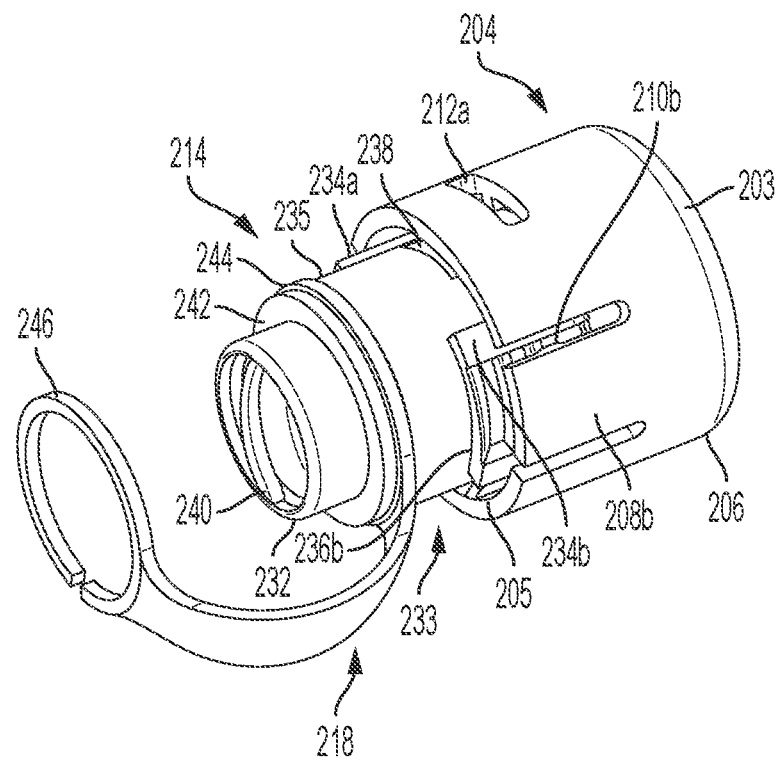
FIG. 14A is a perspective view of a multiuse disinfection cap assembly, according to an aspect of the present disclosure.
Figure 14B:
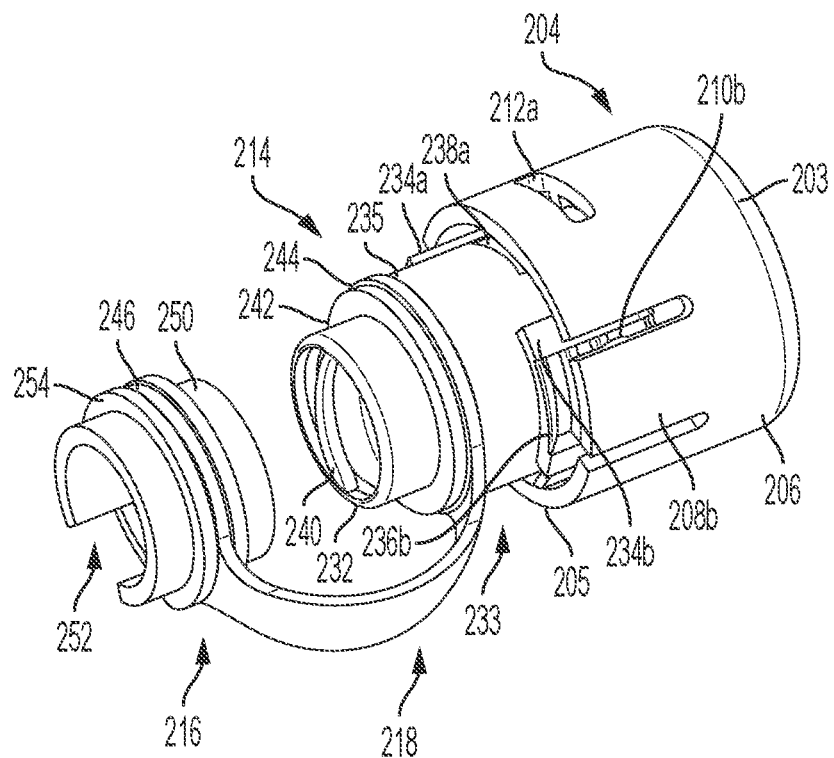
FIG. 14B is a perspective view of a multiuse disinfection cap assembly, according to an aspect of the present disclosure.

Referring to FIGS. 8, 14A, and 14B, after gripper 216 is attached to connector 102, strap 218 may be connected to gripper 216. Gripper 216 may be provided with a strap attachment point 254 (e.g., a channel) to receive a gripper fastening end 246 (e.g., a loop) of strap 218. For example, strap attachment point 254 may comprise a channel shaped to receive and hold a loop of strap 218 in place. In embodiments where gripper fastening end 246 of strap 218 is a loop, the loop may be elastic or include a break to allow the loop to be placed over and into the channel of strap attachment point 254 of gripper 216. A housing fastening end 244 (e.g., a loop) of strap 218 may be connected to housing 214 at a strap attachment point 242 (e.g., a channel) of housing 214. In embodiments where housing fastening end 244 of strap 218 is a loop, the loop may be elastic or include a break to allow the loop to be placed over and into the channel of strap attachment point 242 of housing 214. Strap 218 may be pre-attached to housing 214 by manufacturing personnel, and/or a practitioner may attach strap 218 to housing 214 by affixing housing fastening end 244 of strap 218 to strap attachment point 242 of housing 214. FIG. 14A depicts strap 218 attached to housing 214, and FIG. 14B depicts strap 218 attached to both gripper 216 and housing 214. Because strap 218 may be made of a flexible, bendable, and/or elastic material, once strap 218 is attached to both gripper 216 and housing 214, housing 214 may hang free of female connector 112 of connector 102 until housing 214 is threaded into place on female connector 112. Strap 218 may prevent housing 214 from being dropped or lost during connection to or disconnection from connector 102, by connecting housing 214 to gripper 216 via strap 218. It will also be appreciated that housing 214 may be threaded onto female connector 112 of connector 102 prior to strap 218 being attached to housing 214 and/or gripper 216.

Figure 9A:
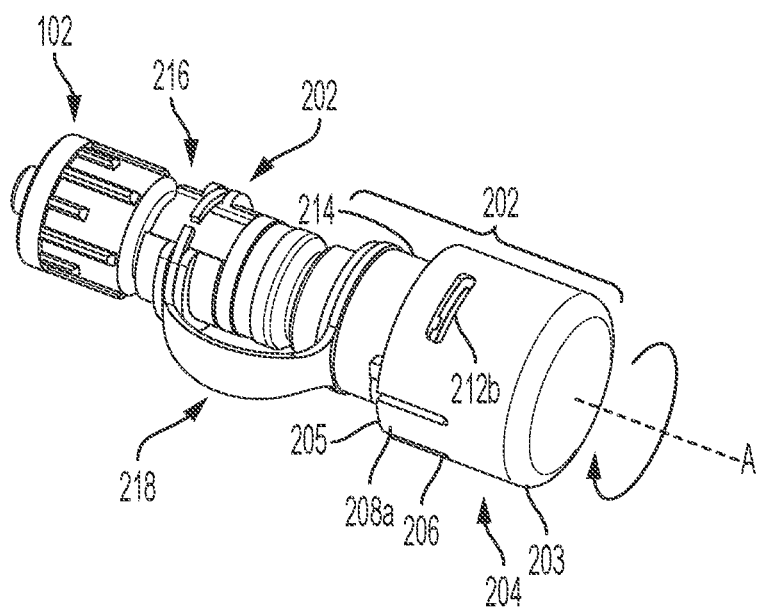
FIG. 9A is a perspective view of a third step in a process for attaching a multiuse disinfection cap assembly to a prior art NFC, according to an aspect of the present disclosure, in which the housing is in a first rotation position during threading of the housing onto the prior art NFC.

Referring to FIG. 9A, housing 214 may be threaded onto female connector 112 by threading the threaded portion 240 of housing 214 onto threads 128 of female connector 112. As shown in FIG. 9A, housing 214 has been placed in a first position where female connector 112 is received inside housing 214 and threaded portion 240 of housing 214 is in contact with threads 128 of female connector 112. The threading may be initiated by rotating housing 214 (e.g., including the attached cap 204 and chamber 220) in a rotational direction (e.g., clockwise) about a longitudinal axis (A).

Figure 9B:
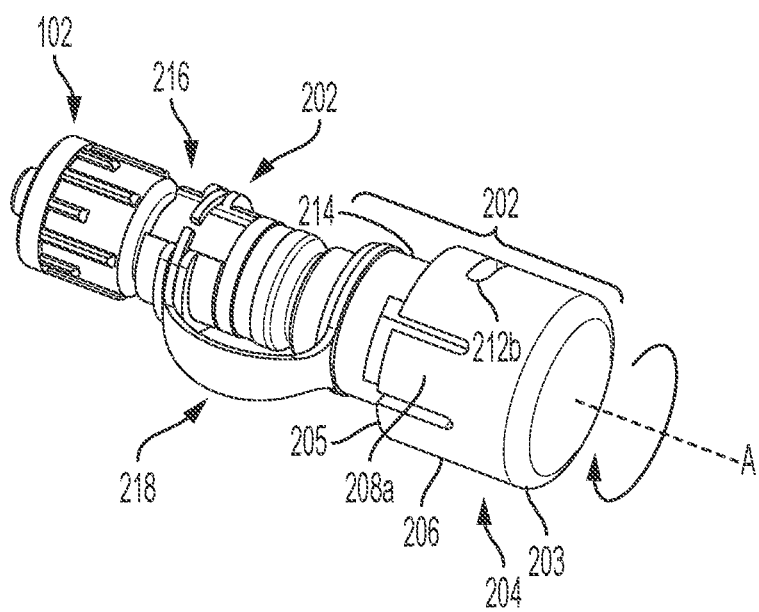
FIG. 9B is a perspective view of a third step in a process for attaching a multiuse disinfection cap assembly to a prior art NFC, according to an aspect of the present disclosure, in which the housing is in a second rotation position (beyond the first rotation position of FIG. 9A) during threading of the housing onto the prior art NFC.

Referring to FIG. 9B, housing 214 has begun to be threaded onto female connector 112. Housing 214 is in a second position where housing 214 (e.g., including the attached cap 204 and chamber 220) has been rotated partly about a longitudinal axis (A). Female connector 112 has been partly drawn into housing 214 (further than depicted in FIG. 9A) as threaded portion 240 of housing 214 is threaded onto threads 128 of female connector 112. Housing 214 is not fully fixed with female connector 112 in the second position of FIG. 9B, and can be further rotated and threaded onto female connector 112 to form a firm connection.

Figure 9C:
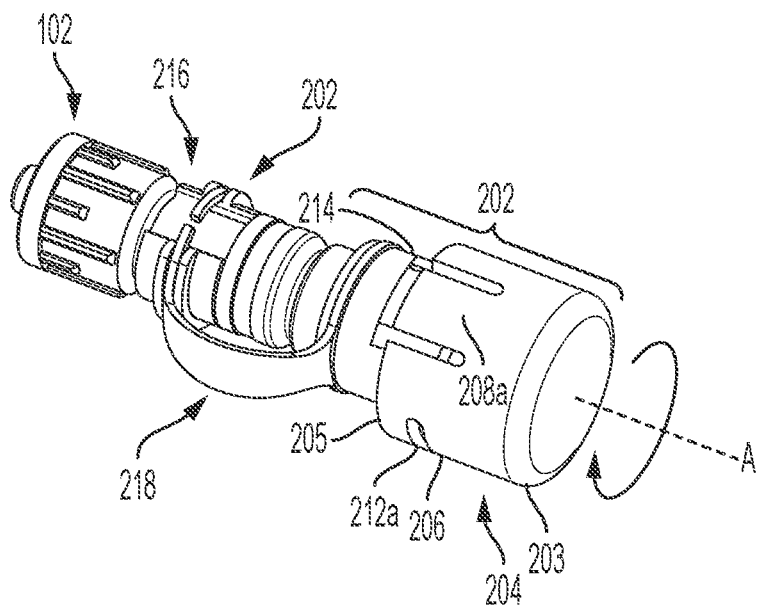
FIG. 9C is a perspective view of a third step in a process for attaching a multiuse disinfection cap assembly to a prior art NFC, according to an aspect of the present disclosure, in which the housing is in a third rotation position (beyond the second rotation position of FIG. 9B) during threading of the housing onto the prior art NFC.

Referring to FIG. 9C, housing 214 has been further threaded onto female connector 112. Housing 214 is in a third position where housing 214 (e.g., including the attached cap 204 and chamber 220) has been rotated further about a longitudinal axis (A). Female connector 112 has been further drawn into housing 214 (further than depicted in FIG. 9B) as threaded portion 240 of housing 214 is threaded onto threads 128 of female connector 112. Housing 214 is not fully fixed with female connector 112 in the third position of FIG. 9C, and can be further rotated and threaded onto female connector 112 to form a firm connection.

Figure 9D:
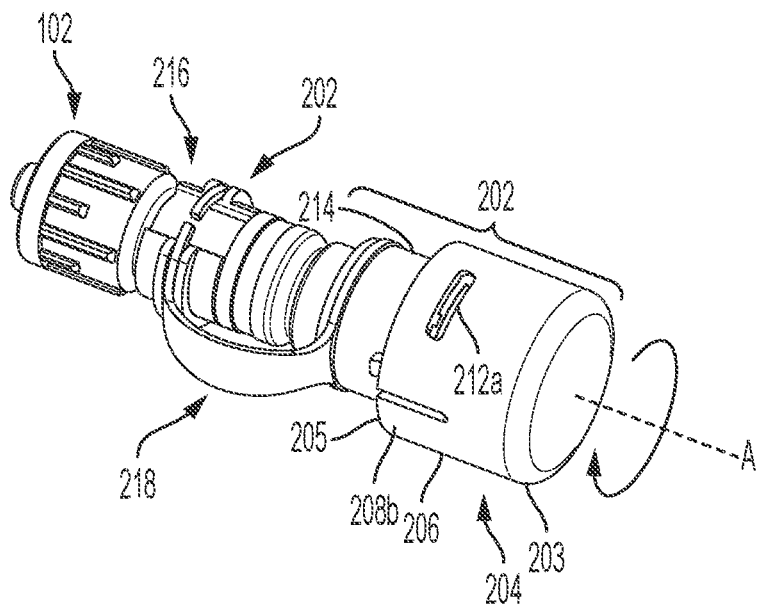
FIG. 9D is a perspective view of a third step in a process for attaching a multiuse disinfection cap assembly to a prior art NFC, according to an aspect of the present disclosure, in which the housing is in a fourth rotation position (beyond the third rotation position of FIG. 9C) during threading of the housing onto the prior art NFC.

Referring to FIG. 9D, housing 214 has been fully threaded onto female connector 112. Housing 214 is in a final position where housing 214 (e.g., including the attached cap 204 and chamber 220) has been rotated fully about a longitudinal axis (A). Female connector 112 has been drawn into housing 214 (further than depicted in FIG. 9C) as threaded portion 240 of housing 214 has been threaded onto threads 128 of female connector 112 until housing 214 has reached a terminus of rotation. Housing 214 is fully fixed with female connector 112 in the final position of FIG. 9D, and cannot be further rotated and threaded onto female connector 112.

Figure 10A:
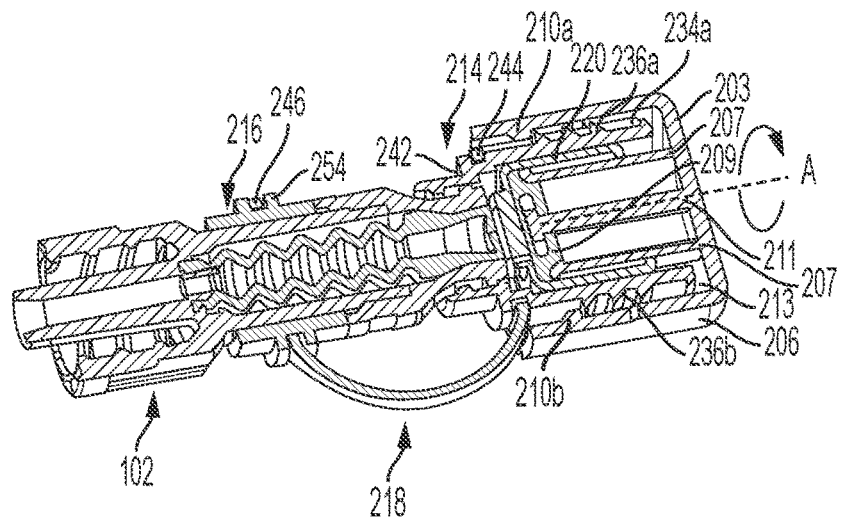
FIG. 10A is a cross-sectional perspective view of a process for removing the cap and chamber from a multiuse disinfection cap assembly, according to an aspect of the present disclosure, in which the cap and chamber are in a first rotation position.
Figure 10B:
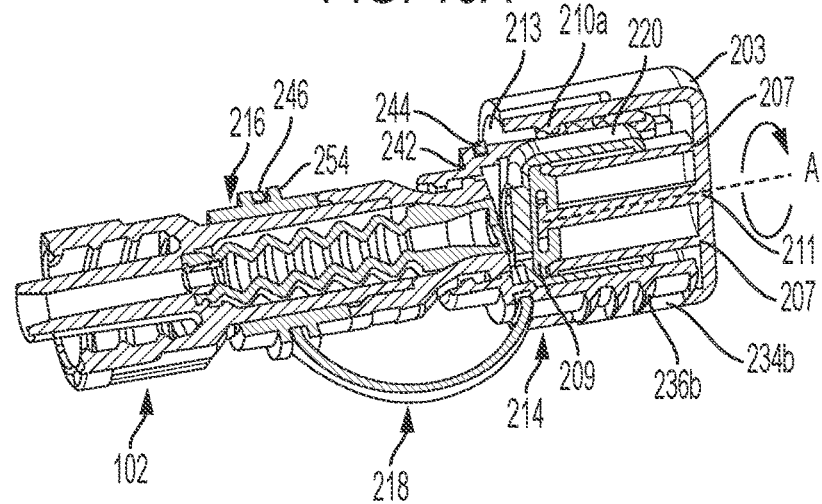
FIG. 10B is a cross-sectional perspective view of a process for removing the cap and chamber from a multiuse disinfection cap assembly, according to an aspect of the present disclosure, in which the cap and chamber are in a second rotation position (beyond the first rotation position shown FIG. 10A)
Figure 10C:
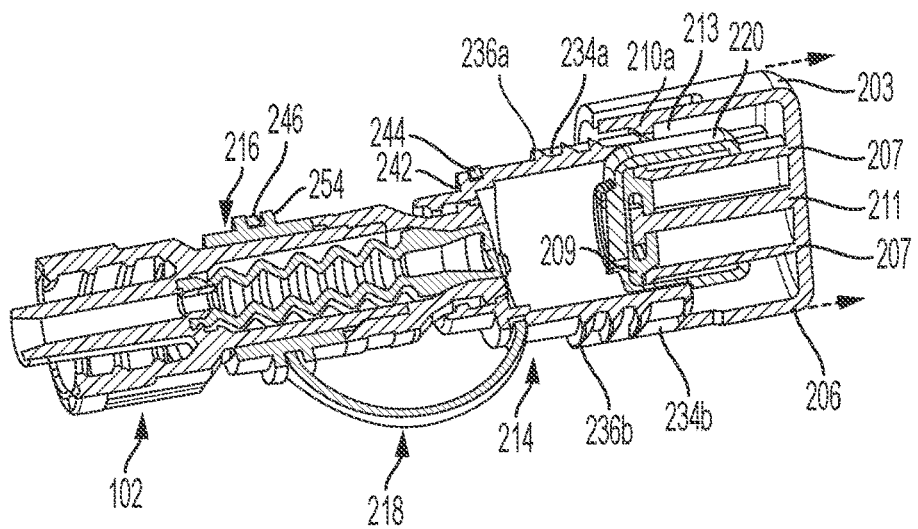
FIG. 10C is a cross-sectional perspective view of a process for removing the cap and chamber from a multiuse disinfection cap assembly, according to an aspect of the present disclosure, in which the cap and chamber are being pulled away from the housing after being rotated to the second rotation position shown in FIG. 10B.

With specific reference to FIGS. 10A-10C, in some non-limiting embodiments or aspects, depicted is a method of removing cap 204 and chamber 220 from housing 214 after chamber 220 has expended the last use of disinfectant. It will be appreciated that the steps of removing cap 204 and chamber 220 described in connection with FIGS. 10A-10C may be performed by a practitioner, after which the practitioner may connect a new cap 204 and chamber 220 to housing 214 (see FIGS. 6A-6B) if desired.

After cap 204 is pushed a final time (placing cap 204 into a final position, depicted in FIG. 5D), in which chamber 220 has expended a final use of disinfectant, at least one ridge 210a, 210b will have slid over a final ridge of plurality of ridges 236a, 236b and escaped channel 234a, 234b of housing 214. Whereas before, when chamber 220 was not yet fully expended and cap 204 could not be rotated freely about a longitudinal axis (A), cap 204 depicted in FIGS. 10A-10C can be freely rotated about the longitudinal axis (A). As shown in FIG. 10A, cap 204 (along with attached chamber 220) is in a first position where at least one ridge 210a, 210b is still aligned with plurality of ridges 236a, 236b, which prevent cap 204 from being pulled along a direction parallel to the longitudinal axis (A). Because at least one ridge 210a, 210b has escaped channel 234a, 234b, cap 204 can now be rotated. As shown in FIG. 10B, cap 204 (along with attached chamber 220) has been rotated about the longitudinal axis (A) to a second position. In the second position, at least one ridge 210a, 210b is no longer aligned with plurality of ridges 236a, 236b, which previously prevented cap 204 from being removed in a direction parallel to the longitudinal axis (A). As such, cap 204 can be removed in a direction parallel to the longitudinal axis (A) from the second position. As shown in FIG. 10C, cap 204 (along with attached chamber 220) is being removed from housing 214 in a direction parallel to the longitudinal axis (A). After cap 204 and chamber 220 are fully removed from housing 214, a new cap 204 and chamber 220 may be connected to housing 214 (see FIGS. 6A-6B).

With specific reference to FIGS. 11A and 11B, in some non-limiting embodiments or aspects, depicted is a cap 204 and chamber 220 for use in multiuse infection cap assembly 202. The assembly of cap 204 to chamber 220 may be performed by manufacturing personnel and/or a machine, such that a practitioner may receive a fully assembled cap 204 and chamber 220 (containing a full reservoir of disinfectant). To assemble, stopper 209 may be placed inside chamber 220. As noted herein, cap 204 may comprise a second sidewall 207 surrounded by first sidewall 206. Chamber 220, containing stopper 209, may be flexibly snapped into place, wherein the sidewall 221 of chamber 220 is flexed apart to fit around second sidewall 207 of cap 204. Chamber 220 may then be pressed as far as possible toward top 203 of cap 204, bringing bottom 224 of chamber 220 toward top 203 of cap 204 and causing center arm 211 to press through hole 95 of stopper 209 into pocket 94 of stopper 209, causing the bottom of center arm 211 to attach to stopper 209. Perforated bottom 224 of chamber 220 may then be placed in communication with a supply of disinfectant, such that disinfectant may freely flow through the perforations of perforated bottom 224. Chamber 220 may then be filled, while maintaining the connection of flow to the supply of disinfectant, by reversing and drawing chamber 220 back away from top 203 of chamber 220, which may create a vacuum force inside chamber 220 to draw disinfectant into chamber 220. After chamber 220 is pulled to its extremum away from cap 204, and stopper 209 is pulled to top 222 of chamber 220, chamber 220 will be filled with disinfectant. Filter 226 may then be placed over perforated bottom 224 of chamber 220 to prevent leakage or contamination of disinfectant. Cap 204 and chamber 220 may be packaged for transport to practitioner for use.

During use, cap 204 and chamber 220 may be connected to housing 214 (see FIGS. 6A-6B), and second sidewall 207 of cap 204 may be configured to slidably engage sidewall 221 of chamber 220. A bottom portion of second sidewall 207 may be flared (e.g., outward) so as to receive a corresponding flared upper portion (e.g., flared inward) of sidewall 221 of chamber 220. In such a manner, second sidewall 207 of cap 204 may engage and slide past sidewall 221 of chamber 220, up to and until the flared upper portion of sidewall 221 engages the flared lower portion of second sidewall 207 of cap 204 (e.g., demarcating a first extremum of movement of second sidewall 207 relative to sidewall 221). The flared portions may prevent chamber 220 from being separated from cap 204 once chamber 220 is fitted into place on cap 204. When second sidewall 207 and sidewall 221 are sliding in a direction such that the flared portions are moving away from one another, center arm 211 may push stopper 209 through chamber 220 to cause disinfectant to be emitted from perforated bottom 224 of chamber 220. Second sidewall 207 and sidewall 221 may continue to slide in such a direction up to and until stopper 209 engages the bottom of chamber 220 (e.g., demarcating a second extremum of movement of second sidewall 207 relative to sidewall 221). When stopper 209 is at the bottom 224 of chamber 220, all uses of chamber 220 have been expended and cap 204 and chamber 220 may be removed from housing 214 (see FIGS. 10A-10C).

In some non-limiting embodiments or aspects, components of multiuse disinfection cap assembly 202, including cap 204, chamber 220, housing 214, and gripper 216, can be molded parts formed by injection molding or other molding processes known in the art. The separately molded parts can be assembled together during manufacturing to provide a pre-packaged multiuse disinfection cap assembly 202. Desirably, the pre-packaged multiuse disinfection cap assembly 202 may include all components needed for scaling, cleaning, and sterilizing connector 102. In some examples, cap 204, chamber 220, housing 214, and gripper 216 can be formed from a thermoplastic polymer material, such as polyester, polycarbonate, polypropylene, polyethylene, polyethylene terephthalate, or acrylonitrile butadiene styrene. Chamber 220 may also be formed from high-density polyethylene (HDPE). Strap 218 may be molded or stamped, and formed from a more flexible material since it is designed to flex, bend, and/or deform in normal usage. Stopper 209 may be formed of isoprene. All of the components of multiuse disinfection cap assembly 202 can be made of medical grade materials and can be sterilized using existing methods know in the art.

While examples of multiuse disinfection cap assembly 202 and methods of use of the present disclosure are shown in the accompanying figures and described hereinabove in detail, other examples will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A multiuse disinfection cap assembly configured to disinfect a connector, comprising:
   a cap comprising a closed top, an open bottom, and a first sidewall extending between the top of the cap and the bottom of the cap, wherein the first sidewall of the cap comprises at least one ridge on an interior surface of the first sidewall of the cap, and wherein the cap further comprises a center arm extending from a center of the top of the cap toward a center of the bottom of the cap;
   a housing comprising an open top, an open bottom, and a sidewall extending between the top of the housing and the bottom of the housing, wherein the sidewall of the housing comprises a plurality of ridges on an exterior surface of the sidewall of the housing that are parallel to the at least one ridge of the first sidewall of the cap and are configured to engage, in sequence, with the at least one ridge of the first sidewall of the cap; and
   a chamber attached to the cap and configured to be inserted into the housing, the chamber comprising an open top and a perforated bottom, wherein the top of the chamber comprises an opening configured to allow the center arm of the cap to extend into the chamber and engage a stopper located within the chamber that seals the top of the chamber;
   wherein the cap is configured to enclose at least a portion of the housing and to be pushed in a downward direction toward the bottom of the chamber a plurality of times, wherein each time of the plurality of times the cap is pushed: (i) the at least one ridge of the first sidewall of the cap slides over a ridge of the plurality of ridges of the sidewall of the housing to allow the cap to advance incrementally in the downward direction; and (ii) the center arm of the cap moves the stopper within the chamber to cause a disinfectant in the chamber to spray out of the perforated bottom of the chamber and onto the connector.

2. The multiuse disinfection cap assembly of claim 1, wherein the cap further comprises a window in the first sidewall of the cap, wherein the housing further comprises a plurality of visual indicia on the exterior surface of the sidewall of the housing associated with a number of uses of the multiuse disinfection cap assembly, and wherein each time of the plurality of times the cap is pushed, the first sidewall of the cap moves over the exterior surface of the sidewall of the housing to reveal a different visual indicium of the plurality of visual indicia via the window.

3. The multiuse disinfection cap assembly of claim 2, wherein the plurality of visual indicia comprises a plurality of different colors.

4. The multiuse disinfection cap assembly of claim 2, wherein, after the cap is pushed a final time of the plurality of times, in which the at least one ridge of the first sidewall of the cap slides over a ridge of the plurality of ridges of the sidewall of the housing that is most distal to the top of the cap, a final visual indicium of the plurality of visual indicia is shown via the window in the first sidewall, wherein the final visual indicium indicates the chamber is empty.

5. The multiuse disinfection cap assembly of claim 1, wherein the housing comprises a threaded portion on an interior surface of the open bottom of the housing, and wherein the housing is configured to receive at least an end of the connector inside the housing and to be threaded onto the connector with the threaded portion so that the housing and the connector are fastened together during disinfection of the connector.

6. The multiuse disinfection cap assembly of claim 5, further comprising:
   a gripper comprising a curved wall comprised of a flexible polymer in a shape of an unconnected ring, wherein the curved wall comprises an opening in a circumference of the curved wall, wherein a width of the opening is smaller than a width of a body of the connector, and wherein the gripper is configured to flexibly snap onto the body of the connector, such that the opening of the curved wall is configured to be temporarily widened to allow the body of the connector to pass through the opening and to allow the gripper to engage the body of the connector with an interior of the curved wall of the gripper; and
   a strap configured to be attached by a first end of the strap to the gripper and by a second end of the strap to the housing, such that the housing is connectable to the connector via the strap and the gripper.

7. The multiuse disinfection cap assembly of claim 1, wherein each ridge of the plurality of ridges of the sidewall of the housing is shaped with a first side forming a slope configured to allow the at least one ridge of the first sidewall of the cap to slide over said each ridge in the downward direction, and is further shaped with a second side forming a wall to prevent the at least one ridge of the first sidewall of the cap to slide over said each ridge in an upward direction opposite the downward direction.

8. The multiuse disinfection cap assembly of claim 7, wherein the at least one ridge of the first sidewall of the cap extends from only a portion of a perimeter of the first sidewall of the cap, wherein the plurality of ridges of the sidewall of the housing extend from only a portion of a perimeter of the sidewall of the housing, wherein the exterior surface of the sidewall of the housing comprises a channel comprising the plurality of ridges and extending along the exterior surface of the sidewall of the housing in a direction parallel to the downward direction, and wherein the at least one ridge of the first sidewall of the cap is configured to be confinably engaged in the channel comprising the plurality of ridges between each time of the plurality of times the cap is pushed.

9. The multiuse disinfection cap assembly of claim 8, wherein the cap is further configured such that, after the cap is pushed a final time of the plurality of times, in which the at least one ridge of the first sidewall of the cap slides over a ridge of the plurality of ridges of the sidewall of the housing that is most distal to the top of the cap, the at least one ridge escapes the channel of the sidewall of the housing to allow the cap to be rotated and removed from the housing.

10. The multiuse disinfection cap assembly of claim 9, wherein the cap comprises a second sidewall extending between the top of the cap and the bottom of the cap, wherein the second sidewall is surrounded by the first sidewall, and wherein a sidewall of the chamber is slidably engaged with the second sidewall of the cap.

11. The multiuse disinfection cap assembly of claim 1, further comprising a filter positioned adjacent the perforated bottom of the chamber to block air and prevent leakage of the disinfectant.

12. A multiuse disinfection cap assembly configured to disinfect a connector, comprising:
a cap comprising a closed top, an open bottom, a first sidewall extending between the top of the cap and the bottom of the cap, and a second sidewall extending between the top of the cap and the bottom of the cap, wherein the second sidewall is surrounded by the first sidewall, wherein the first sidewall of the cap comprises at least one ridge on an interior surface of the first sidewall of the cap that is configured to engage, in sequence, with a plurality of ridges on an exterior surface of a sidewall of a housing attached to the connector, and wherein the cap further comprises a center arm extending from a center of the top of the cap toward a center of the bottom of the cap; and
a chamber comprising a sidewall extending between an open top of the chamber and a perforated bottom of the chamber, wherein the sidewall of the chamber is slidably engaged with the second sidewall of the cap, and wherein the top of the chamber comprises an opening configured to allow the center arm of the cap to extend into the chamber and engage a stopper located within the chamber that seals the top of the chamber;
wherein the cap is configured to be pushed in a downward direction toward the bottom of the chamber a plurality of times, wherein each time of the plurality of times the cap is pushed: (i) the at least one ridge of the first sidewall of the cap slides over a ridge of the plurality of ridges of the sidewall of the housing to allow the cap to advance incrementally in the downward direction; and (ii) the center arm of the cap moves the stopper within the chamber to cause a disinfectant in the chamber to spray out of the perforated bottom of the chamber and onto the connector.

13. The multiuse disinfection cap assembly of claim 12, wherein the cap further comprises a window in the first sidewall of the cap, and wherein each time of the plurality of times the cap is pushed, the first sidewall of the cap moves over the housing to reveal, via the window, a different visual indicium of a plurality of visual indicia on an exterior surface of the sidewall of the housing.

14. The multiuse disinfection cap assembly of claim 12, wherein each ridge of the at least one ridge of the first sidewall of the cap is shaped with a first side forming a slope configured to allow said each ridge to slide over the plurality of ridges of the sidewall of the housing in the downward direction, and is further shaped with a second side forming a wall to prevent said each ridge from sliding over the plurality of ridges of the sidewall of the housing in an upward direction opposite the downward direction.

15. The multiuse disinfection cap assembly of claim 12, further comprising a filter positioned adjacent the perforated bottom of the chamber to block air and prevent leakage of the disinfectant.

16. The multiuse disinfection cap assembly of claim 12, wherein the cap is further configured such that, after the cap is pushed a final time of the plurality of times, in which the at least one ridge of the first sidewall of the cap slides over a ridge of the plurality of ridges of the sidewall of the housing that is most distal to the top of the cap, the at least one ridge escapes a channel of the sidewall of the housing to allow the cap to be rotated and removed from the housing.

17. A multiuse disinfection cap assembly configured to disinfect a connector, comprising:
a cap comprising a closed top, an open bottom, a first sidewall extending between the top of the cap and the bottom of the cap, and a window in the first sidewall of the cap, wherein the first sidewall of the cap comprises at least one ridge on an interior surface of the first sidewall of the cap that is configured to engage, in sequence, with a plurality of ridges on an exterior surface of a sidewall of a housing attached to the connector, and wherein the cap further comprises a center arm extending from a center of the top of the cap toward a center of the bottom of the cap; and
a chamber comprising an open top and a perforated bottom, wherein the top of the chamber comprises an opening configured to allow the center arm of the cap to extend into the chamber and engage a stopper located within the chamber that seals the top of the chamber;
wherein the cap is configured to enclose at least a portion of the housing and to be pushed in a downward direction toward the bottom of the chamber a plurality of times, wherein each time of the plurality of times the cap is pushed: (i) the at least one ridge of the first sidewall of the cap slides over a ridge of the plurality of ridges of the sidewall of the housing to allow the cap to advance incrementally in the downward direction; (ii) the first sidewall of the cap moves over the housing to reveal, via the window, a different visual indicium of a plurality of visual indicia on an exterior surface of the sidewall of the housing; and (iii) the center arm of the cap moves the stopper within the chamber to cause a disinfectant in the chamber to spray out of the perforated bottom of the chamber and onto the connector.

18. The multiuse disinfection cap assembly of claim 17, wherein each ridge of the at least one ridge of the first sidewall of the cap is shaped with a first side forming a slope configured to allow said each ridge to slide over the plurality of ridges of the sidewall of the housing in the downward direction, and is further shaped with a second side forming a wall to prevent said each ridge from sliding over the plurality of ridges of the sidewall of the housing in an upward direction opposite the downward direction.

19. The multiuse disinfection cap assembly of claim 17, further comprising a filter positioned adjacent the perforated bottom of the chamber to block air and prevent leakage of the disinfectant.

20. The multiuse disinfection cap assembly of claim 17, wherein the cap is further configured such that, after the cap is pushed a final time of the plurality of times, in which the at least one ridge of the first sidewall of the cap slides over a ridge of the plurality of ridges of the sidewall of the housing that is most distal to the top of the cap, the at least one ridge escapes a channel of the sidewall of the housing to allow the cap to be rotated and removed from the housing.

\* \* \* \* \*